US010179552B2

(12) United States Patent
Haque

(10) Patent No.: US 10,179,552 B2
(45) Date of Patent: Jan. 15, 2019

(54) DIGITAL VEHICLE TAG AND METHOD OF INTEGRATION IN VEHICLE ALLOCATION SYSTEM

(71) Applicant: DriverDo LLC, Overland Park, KS (US)

(72) Inventor: Mashhur Zarif Haque, Lawerence, KS (US)

(73) Assignee: DriverDo LLC, Overland Park, KS (US)

(*) Notice: Subject to any disclaimer, the term of this patent is extended or adjusted under 35 U.S.C. 154(b) by 0 days.

(21) Appl. No.: 16/105,559

(22) Filed: Aug. 20, 2018

(65) Prior Publication Data

US 2018/0354431 A1 Dec. 13, 2018

Related U.S. Application Data

(63) Continuation of application No. 15/905,171, filed on Feb. 26, 2018, now Pat. No. 10,053,028, which is a continuation of application No. 14/485,367, filed on Sep. 12, 2014, now Pat. No. 9,902,343, which is a continuation-in-part of application No. 14/084,380,
(Continued)

(51) Int. Cl.
| | |
|---|---|
| *B60R 13/10* | (2006.01) |
| *H04W 4/02* | (2018.01) |
| *G08B 13/14* | (2006.01) |
| *G08G 1/017* | (2006.01) |
| *B60R 25/01* | (2013.01) |
| *G06Q 10/06* | (2012.01) |
| *H04W 4/40* | (2018.01) |
| *H04L 29/08* | (2006.01) |

(52) U.S. Cl.
CPC .......... *B60R 13/10* (2013.01); *B60R 25/01* (2013.01); *G06Q 10/06311* (2013.01); *G08B 13/14* (2013.01); *G08G 1/017* (2013.01); *H04W 4/025* (2013.01); *H04L 67/12* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 5,105,179 A | * | 4/1992 | Smith | B60Q 1/56 340/461 |
| 5,381,155 A | * | 1/1995 | Gerber | G08G 1/017 340/936 |

(Continued)

*Primary Examiner* — Gurkanwaljit Singh
(74) *Attorney, Agent, or Firm* — Erise IP, P.A.

(57) ABSTRACT

A system and method for allocating drivers to procure targets, such as automobiles. These targets are then transported to a desired drop-off destination. The entire system is automated, such that a requestor may hire drivers that are certified by the system and would satisfy requirements associated with the target, such as proper driver's license and location of the driver relative to the target. The system is powered by an internet based mobile application that is designed to match individual drivers to auto dealers, auction houses, driving transport companies and other businesses and individuals ("requestors") seeking to move automobiles, goods, services, tasks, etc. from one location to another. The system has been designed to find, organize, and manage drivers and all aspects of the trip on a real time basis and reduce the cost of the existing system.

20 Claims, 19 Drawing Sheets

Related U.S. Application Data filed on Nov. 19, 2013, which is a continuation-in-part of application No. 13/987,495, filed on Jul. 31, 2013, now abandoned.

(56) References Cited

U.S. PATENT DOCUMENTS

| | | | | |
|---|---|---|---|---|
| 5,621,571 A * | 4/1997 | Bantli | ................... | B60R 13/10 340/907 |
| 5,657,008 A * | 8/1997 | Bantli | ................... | B60R 13/10 340/933 |
| 6,404,327 B1 * | 6/2002 | Naddeo | ................... | B60Q 1/56 340/426.11 |
| 6,641,038 B2 * | 11/2003 | Gehlot | ................... | B60R 13/10 235/384 |
| 7,096,102 B1 * | 8/2006 | Parker, Sr. | ............ | B60R 25/102 340/426.1 |
| 7,142,104 B1 * | 11/2006 | Blueford | ............... | B60Q 1/503 340/472 |
| 7,504,965 B1 * | 3/2009 | Windover | ............ | G08G 1/0175 340/933 |
| 7,551,088 B2 * | 6/2009 | Findlay | ................. | G01S 13/825 235/383 |
| 7,696,864 B2 * | 4/2010 | Dillon | ................... | B60Q 1/503 340/468 |
| 9,221,405 B2 * | 12/2015 | Davis | ..................... | B60R 25/00 340/425.5 |
| 2002/0021210 A1 * | 2/2002 | Naddeo | ................... | B60Q 1/56 340/425.5 |
| 2003/0112242 A1 * | 6/2003 | Vitale | ..................... | B60Q 1/56 345/440 |
| 2003/0142044 A1 * | 7/2003 | Berry | .................... | B60Q 1/503 345/55 |
| 2005/0192744 A1 * | 9/2005 | Maqui | .................... | G09F 21/04 701/431 |
| 2006/0164258 A1 * | 7/2006 | Garibotto | ............... | G08G 1/017 340/937 |
| 2006/0213100 A1 * | 9/2006 | McCann | ................. | B60R 13/00 40/591 |
| 2008/0252457 A1 * | 10/2008 | Findlay | ................. | G01S 13/825 340/286.01 |
| 2014/0249713 A1 * | 9/2014 | Davis | ..................... | B60R 13/10 701/36 |
| 2016/0039364 A1 * | 2/2016 | Findlay | ................. | B60R 13/105 340/468 |

\* cited by examiner

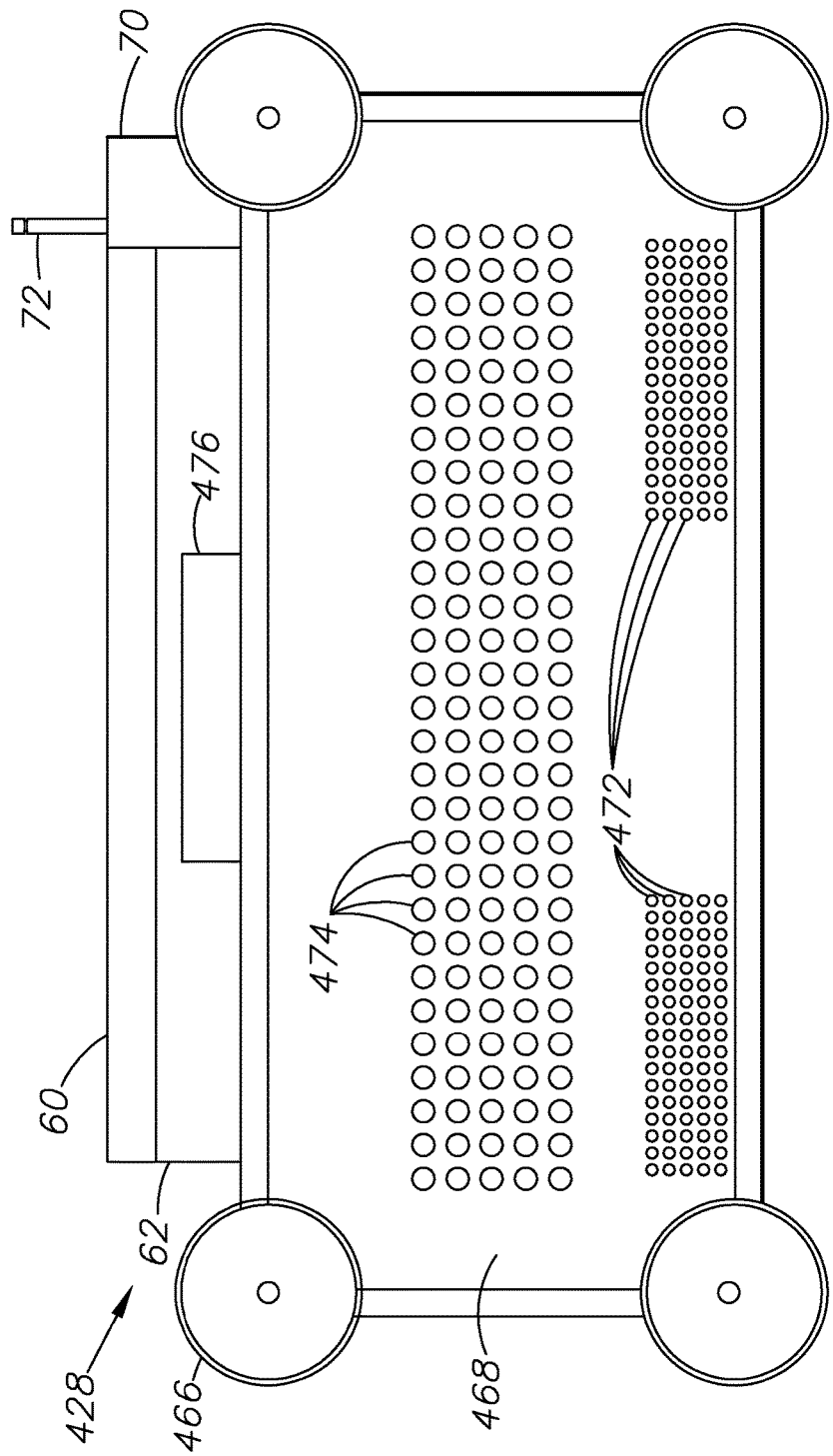

FIG. 8D

Trip Request Settings
☑ Auto Request
☐ Post To All Drivers
☑ Use Preferred Drivers
☑ Use Local if Preferred Unavailable
Trip Invite [Until Complete ▷]
☑ Manual Request
Response Time [10 Min. ▷]
[Save]

FIG. 8C

[Nav.] [Map View]
[Misc.] [Gatepass] [Condition Report]
Trip Title
Assigned VIN: XXXXXXX
Enter Plate No.
Enter Miles
☐ En Route to Drop-Off
☐ Chase Car
☐ Target Car
☑ Heading to Pick-Up
☐ Reached Destination
[Problem!]

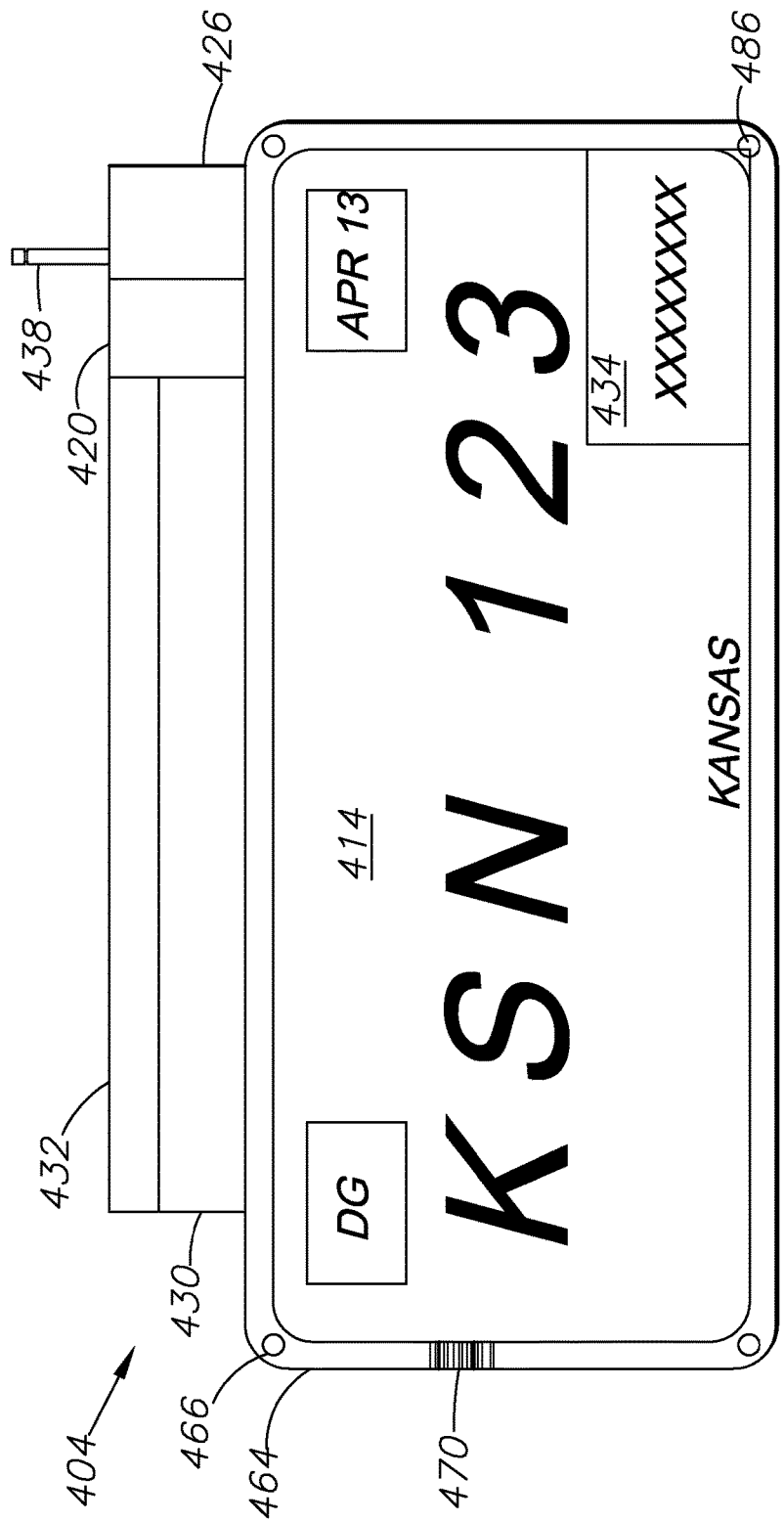

DIGITAL VEHICLE TAG AND METHOD OF INTEGRATION IN VEHICLE ALLOCATION SYSTEM

RELATED APPLICATION

This non-provisional patent application is a continuation of, and claims priority benefit to U.S. patent application Ser. No. 15/905,171, filed Feb. 26, 2018, which is a continuation of U.S. patent application Ser. No. 14/485,367, filed Sep. 12, 2014, now U.S. Pat. No. 9,902,343, which is a continuation-in-part of U.S. patent application Ser. No. 14/084,380, filed Nov. 19, 2013, which is a continuation-in-part of U.S. patent application Ser. No. 13/987,495, filed Jul. 31, 2013, now abandoned. These patent applications are hereby incorporated by reference in their entirety into the present application.

BACKGROUND

1. Field

The present invention is related generally to a driver allocation system and method, and more specifically to a system including mobile computing devices with application software capable of assigning and managing resources such as drivers, and the process to retrieve and drop off targets from locations throughout the world and drop those targets off at desired locations.

2. Background and Description of Related Art

Automobile businesses need to transport vehicles from one point to another on a regular basis. Examples include transporting individual vehicles to and from locations such as auction houses, dealer lots, inspection stations, etc. Presently, the requestors use methods such as making phone calls, or using the services of third parties to find, organize and manage drivers. Existing processes of transporting vehicles via these methods are slow, inefficient, difficult to manage, and costly. They are prone to problems caused by events including, but not limited to, loss of paperwork such as gate passes, vehicle condition reports, and payment receipts by drivers, etc. Timely availability of drivers, tracking of vehicles in parking lots and in-transit on real time basis, establishing instant communication with and monitoring and control of drivers by the requestors are not possible because the communication is carried by phone. The confusion makes the process difficult to manage. Multiple vehicles transported from same origin to same destination with each vehicle being driven by each driver make it necessary for the requestor to repeat the same instructions to each driver. Repetition of the same instruction multiple times unnecessarily ties up valuable management times of the requestors making the process slow and inefficient. Real time vehicle sequencing during the auction sales, locating the vehicles in the large auction lots where thousands of vehicles are stationed, managing and monitoring of each auto sales process during auction, and inserting and managing the sales of out of sequence vehicles brought by customers are now carried through verbal, phone communications and CB radios, and many confusions and costly mistakes occur.

Overall, the existing process is costly for the requestors and the drivers alike because (1) the requestors spend a lot of time in managing the system such as but not limited to giving directions to each driver separately, VIN and Gate Pass information, and special instructions, making phone calls back and forth, (2) of thefts by unscrupulous drivers and others e.g. stolen headrest, missing books, keys, drive shift knobs, (3) drivers do not drive on clock but bill for more hours, (4) third party companies are paid for their services as a middle man, (5) accurate delivery time cannot be determined, (6) drivers are not paid for any lost receipt and (7) of inability to enforce driver accountability during vehicle transporting. Also, reporting by the drivers to reconcile the vehicle condition (e.g. as to dents and scratches) at the auction house exit gate with the condition at the auction bid acceptance time is not easily executed in the existing process. Condition status reports are now communicated verbally by the drivers to the requestors. This verbal system has many deficiencies such as the requestor being usually very busy and multitasking may totally forget to record the problem, or may assign the problem to the wrong vehicle or wrong location in the vehicle. For example, vehicle A in actuality may pull to the right while driving; instead the requestor may assign the problem to vehicle B as being pulled to the left. Therefore, finding and repairing the problem become costly.

An additional problem of vehicle transporting using the present standard is caused by the way insurance is handled. Presently, insurance providers that underwrite insurance policies to the drivers and dealers do not have adequate means to gather appropriate and desirable data that serve the interests of the providers. The underwriters rely on the data that the dealers or insurance agents provide them, do not have any means to verify the accuracy and authenticity of the data and accept the data mainly based on faith. During the application process for purchasing insurance, the purchasers such as dealers, auctioneers, and drivers are asked by the insurance companies to answer the type of questions some of which are listed below: a) How many cars do you estimate that you transport with drivers or Drive-Away? b) Are the driver(s) employee(s) or independent contractor(s)? c) If employee(s), please list driver license number (DL No.), social security no (SSN), date of birth (DOB) etc. d) How far are the trips typically? Please give radius. e) How many of these trips are made within the estimated radius? f) What is the maximum distance of the drive? g) What is the highest value of vehicle you expect to drive?

Many drivers are independent individuals who do not have driver employees. Although these individuals have personal auto insurance, they do not have "commercial" insurance that covers the cars they drive for others when "working," and Workman Compensation, collision liability and physical damage. Dealers take the risk with independent drivers essentially carrying most if not all of the risks by buying insurance policies usually with high deductibles to save on cost of high premiums. Major losses result in high future premiums or cancellation. Of course, the dealers have the choice to hire drivers as their employees which results in higher costs including FICA, taxes, insurance etc.

There are also driver's unions which add additional expense to dealers and other requesting parties. These costs are unavoidable if a dealer goes through a union or union-affiliated service for acquiring drivers, which presently may be necessary in some locations or for some jobs, due to a lack of alternative services.

Presently, insurance policies to cover transporting of vehicles by drivers are underwritten based on bulk volume of vehicles or piggy-backing on other policies, and the policies are based on periodic rates such as daily, monthly, quarterly, yearly etc. Premiums for these types of policies are quite high.

Each transporting trip is generally different from others as to such variables as the transporting distance, property value, ownership of the asset, insurance, and legal and other requirements. Customization of each trip is presently accomplished by time consuming and costly manual methods. Examples of trip customization include items such as handling of assigned license plate and expenses. Involved parties frequently forget to gather necessary documents including license plates. Such lapses at the least cause costly delays and additional travels. Customizable trip-by-trip features, such as handing of license plates and expenses, are not adequately addressed by the present method of assigning drivers to retrieve targets such as automobiles to be sold at auction or at remotely located dealerships.

What is desired is to develop a system that will be more efficient, easier to customize, faster, easier to manage, and less costly. A desired insurance system would also include situations where if a car, X, is transported by a driver, Y, from point, A, to point, B, the insurance policy for this trip consists of the trip from point, A, to point, B, by the driver, Y, and for the time period needed to complete the trip. Once the trip is completed the policy is terminated. The stake holders in this new paradigm of insurance are the dealer (car owner), the driver and the insurance underwriter. The cost of the insurance premium in this case could be shared partially by the dealer and the driver through mutually agreeable terms. A desired system would also include a trip-specific electronic transmission of a digital license plate to the driver of the vehicle.

Heretofore there has not been available a drive-away driver allocation system and method of assigning drivers for target pick-ups with the advantages and features of the present invention.

SUMMARY OF THE INVENTION

A method and system are provided to find, contract, organize, and manage drivers and the process of transporting vehicles by the requestor using internet based wired and wireless communication and management system. The system allows for the purchase of by-the-trip insurance on-the-fly, trip-specific digital license plate transmitted to a target party by activation code, accurate record keeping of vehicle conditions, recordation and control of costs, efficient use of drivers by using real time GNSS (e.g. GPS) via mobile and fixed devices such as cell phones, tablet and desktop computers, etc.

An internet based application that will allow on a real time basis at least: (1) webcasting the need for services of driver(s) by a requestor whereby the need will be transmitted to the intended drivers or pool of drivers (2) responding to the requestor by the drivers with their terms and availability (3) accepting the terms of the drivers by the requestor (4) purchasing by-the-trip insurance on-the-fly (5) wirelessly transmitting a trip-specific digital license plate to the driver of the trip (6) executing the transportation of a vehicle or a fleet of vehicles in an optimal manner (7) recording and reporting the vehicle status before the vehicle leaves the auction gate (8) reporting and monitoring of the trip status report at any time (9) recording and reporting of expenses and drivers bills and (10) monitoring and controlling of the vehicle transportation process on a real time basis. It must be repeated here that each of the functions listed above can be accomplished on a real time basis.

An embodiment of the present invention may be used to coordinate drivers for an innumerable amount of purposes. Some examples include chauffer jobs or a simple errand trip request. Drivers are allocated by requestors to pick up and drop off targets, which may include anything the requestor might need. A preferred embodiment would be where the requestor is an automobile dealer and the target is a car desired for sale; however, as above, any conceivable target could be assigned to a driver for pick-up and delivery, including a passenger.

BRIEF DESCRIPTION OF THE DRAWING FIGURES

The drawings constitute a part of this specification and include exemplary embodiments of the present invention and illustrate various objects and features thereof FIG. 1 is a diagrammatic representation of the relationships between various elements included in an embodiment of the present invention.

FIG. 7A is an elevational view of an alternative digital license tag plate which may be incorporated into the practice of an alternative embodiment of the present invention.

FIG. 8C is a screenshot of a user interface associated with the practice of a preferred embodiment of the present invention, showing trip status details.

FIG. 8D is a screenshot of a user interface associated with the practice of a preferred embodiment of the present invention, showing trip request settings entered by a requestor.

FIG. 9 is an alternative embodiment digital tag to be used with an alternative embodiment trip system.

DETAILED DESCRIPTION

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Additional examples include a mobile smart device including a display device for viewing a typical web browser or user interface will be commonly referred to throughout the following description. The type of device, computer, display, or user interface may vary when practicing an embodiment of the present invention. Drivers and couriers are the resources to be allocated using the present invention, and may often be used interchangeably, as may dealers and requestors. Said terminology will include the words specifically mentioned, derivatives thereof and words of similar meaning.

The overarching purpose of the present invention is to create a trip request from a requesting party 4 to a driver 6 or other resource, wherein the purpose of the trip is to collect a target and return, or deliver to a remote location, that target. The trip request is automatically generated using a third-party service stored at a remote server 12. Some features may be individually selectable by the requesting party 4, or may be automatically generated, based on a number of parameters, by the remote server 12 CPU.

II. Embodiment or Aspect of the Driver Allocation System 2

Figure 1:
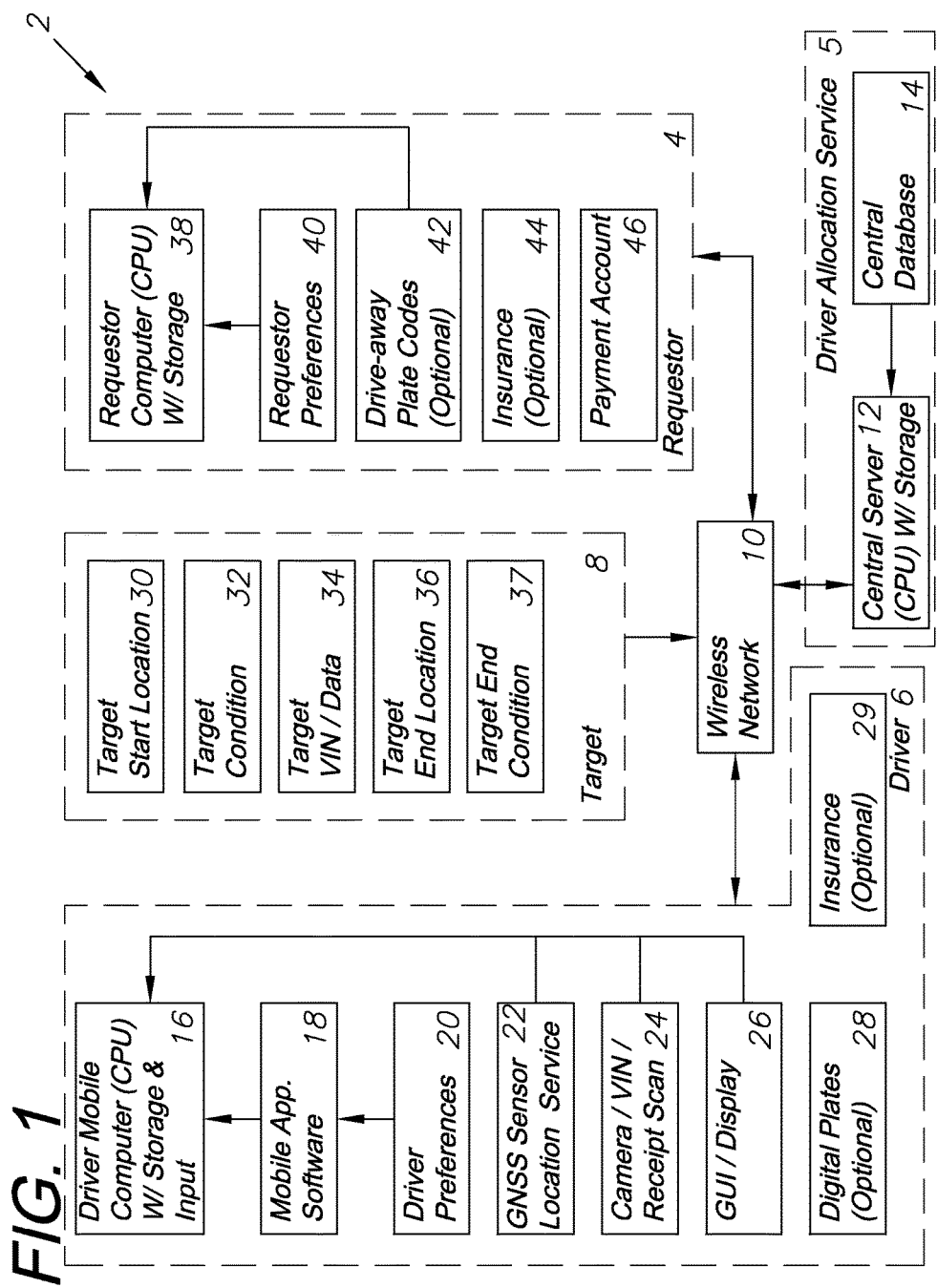
FIG. 1A is a diagrammatic representation of the relationships between various alternative elements included in an alternative embodiment of the present invention.

Referring to the figures in more detail, FIG. 1 shows the relationships between various elements of a driver allocation system 2. At the core of the system is a driver allocation service 5 which generally requires a central server 12 complete with CPU and data storage, a central database 14 stored within said central server, and software necessary to oversee the entire system, including sending instructions and receiving requests from the various other elements, including at least one requestor 4, one driver 6, data regarding a target 8. All of this information is shared over a wireless network 10, and via the internet.

The requestor 4 may be an automobile dealer or auction service that is looking for target 8 items, typically vehicles. The requestor has a computer 38 capable of accessing the central server 12 and all software associated with the driver allocation system 2. The requestor 4 will input or import his preferences 40 into the requestor computer 38, which will help to facilitate the selecting of drivers 6 for the acquisition of targets 8. Optionally, a requestor may have code(s) 42 for drive-away plates 28 which provide temporary displays of plate information, such as license plate number, expiration time or date, and the state in which the plate would be registered. This code may be transferred wirelessly over the wireless network 10 to a driver 6 who has functioning digital plates 28.

Similarly, the requestor may have trip insurance 44 which may be associated with a particular trip. A driver 6 may also have his or her own insurance 29 which would be associated with that trip. Alternatively, these insurances could each function to cover a portion of any given trip. Insurance data is transferred back and forth, and is stored in the central database 14, via the wireless network 10. Finally, the requestor's payment account 46 must be associated with the driver allocation system 2 such that drivers are paid automatically upon successfully and satisfactorily completing a trip.

Similarly, each driver 6 is associated with a mobile computer 16 such as a smart phone or tablet computer. This computer includes data storage capable of storing the mobile application software 18 which allows the driver to interact with the central server 12, the requestor 4, and all other aspects of the driver allocation system 2. The driver's preferences 20, including the driver's certifications, driving experience, general location, and other relevant details are also stored on the mobile device and are associated with the application software 18.

The mobile computer 16 should also include a Global Navigation Satellite System (GNSS) sensor 22 or other location device for determining the driver's 6 real time position on Earth. This allows the system 2 to instruct the driver from point A to point B, such as to reach a target's 8 initial location 30, and then transport the target to a drop-off location 36.

The mobile computer 16 should also include a camera 24 or other device for scanning a vehicle's identification number (VIN), logging receipts for expenses, and for keeping record of the vehicle's condition such as by photographing dents, scrapes, and other defects. Photographs of starting and ending mileage would also be logged using the camera. The scanning function also allows for files or data to be exploded and used for different file formats.

The mobile device must have an interactive graphical user interface (GUI) 26 for interacting with the mobile application software 18.

The driver may have digital license plates 28 which receive codes from a requestor 4 via the driver's mobile computer 16. This allows temporary licensure of a vehicle during the transportation process only, after which the temporary code expires and the digital tag may be reused. More detail on the digital tags can be found below and in FIGS. 7 and 7A.

As mentioned above, the driver may have his or her own insurance 29 associated with jobs accepted by the driver 6. This insurance may be typical insurance; however, preferably the insurance would be trip-by-trip specific and would be estimated and paid for on a per-trip basis. More information on how trip-by-trip insurance would function can be found below.

The target 8, typically a vehicle identified by the requestor 4 for pickup, has a starting location 30, a starting condition 32, associated vehicle data 34 (e.g. a VIN), and a target ending location 36 and associated ending condition 37. Vehicle condition includes basic information, such as the odometer reading of the vehicle, and also more important information, such as the condition of the vehicle externally and internally. If the ending condition 37 differs from the starting condition 32 in more than minor ways, there may need to be an insurance report made or payment may be withheld from the driver until the vehicle is repaired.

It should be noted that more than one target 8 may be designated to the driver(s) at a time. A processor belonging to either the central server 12 or the requestor's 4 computer 38 will calculate an optimal route and/or an optimal amount of additional drivers 6 needed to complete the task of acquiring all targets 8 and moving those targets 8 to their respective drop-off destinations 36. Expense and time are necessary components to this calculation. The requestor 4 will be notified how many drivers 6 and/or how many trips are going to be needed such that the requestor 4 can allocate the appropriate drivers 6 to the appropriate targets 8. Additionally, the system may further optimize the trips by the seating capacity of a number of vehicles, including each target 8 if the target is a vehicle. These factors are all computed to produce the optimal result for acquiring the target(s) 8.

Each driver 6 may also be assigned by the central server 12 processing the location(s) of each driver and the distance between driver(s) 6 and target(s) 8. Each driver verifies the target by scanning the ID data 34 (e.g. VIN) when the driver 6 reaches the target 8 start location 30. In the case where a VIN 34 is scanned, it may have optionally been scanned by the initiating/selling party previously. The second scan by the driver 6 verifies that this is the target 8 to be moved and authorizes the transaction.

In the case of multiple vehicles, multiple targets, and/or multiple drivers, the requestor has the ability to track each and every target, driver, and vehicle at once using the same computer 38. A "tracking view" allows the requestor 4 to review status updates and geographic positioning information on each driver 6 and target 8 as they are reported via the driver allocation service 5. A map may be pulled up on the display of the requestor's computing device 38 which actively tracks the geographic GNSS position of each driver 6 actively being tracked and/or employed by the requestor 4 for a trip request. The requestor 4 may select the indicator on the display for one driver 6, and the display will update showing the details of that particular driver, including details about the vehicle and/or target associated with the river, the estimated time of arrival for the driver, the status of the target, and other relevant details.

At the end of a trip, a report may be generated by the central server CPU 12 and delivered to a requesting party. For example, if a requestor 4 requests a report, the report sent to him may include an analysis of the trip including total expenses of all drivers, other payments, vehicle statistics, such as miles-per-gallon and average speed, and other valuable data. Similar data may be requested by a driver 6 and used to file tax documents such as a standard 1099 form.

When drivers 6 register with the driver allocation service 5 using their mobile computing devices 16, they may have the option of purchasing or renting the digital plates 28 which will be sent to the driver 6 at the address provided by the driver 6 via the driver's profile. Additionally, a pre-paid or pre-loaded debit card may be sent to the driver. This debit card may be reloaded by the driver 6 for purchasing supplies or other services, and it may be recharged when the driver 6 is paid by a requestor 4 from the requestor's payment account 46.

Figure 1A:
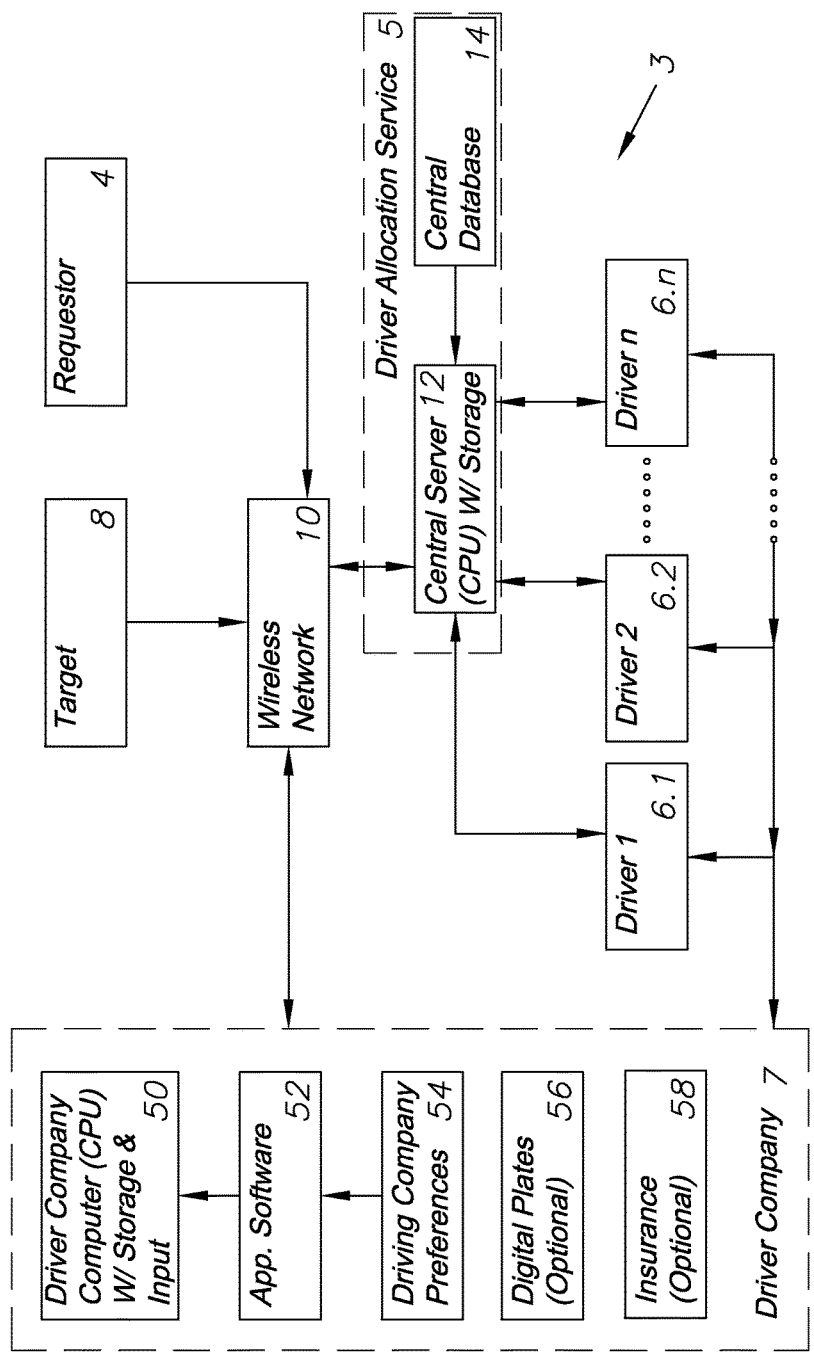

FIG. 1A demonstrates a similar setup wherein a third party driver company 7, who employs or has readily available a number of drivers 6.1, 6.2, 6.$n$, for performing the same tasks as discussed above. However, the company 7 requires additional relationships to be formed via the wireless network 10, and has its own set of information and requirements for association with an alternative driver allocation system 3. Functionally the system operates the same as discussed above. However, the driver company 7 has its own computer 50 including data storage and CPU for accessing its own version of application software 52 allowing the driver company 7 to interact with drivers 6 and requestors 4. The driver company's preferences 54, including credentials and driver-related data, are stored on the company's computer 50 and would likely also be contained in the central database 14.

In this scenario, the driving company may have its own set of digital plates 56 for use by any number of drivers 6.1, 6.2, 6.$n$. Similarly, the driving company 7 may have its own insurance 58, preferably a trip-by-trip insurance, which can be applied to any or all trips by the company's drivers.

A similar scenario to that shown in FIG. 1A includes a lead driver who is assigned with finding additional drivers 6$n$ for picking up additional targets 8 or for following the lead driver in a follow-car. The lead driver may be invited to the job by the requestor 4, but the additional positions may be picked by the lead driver 6 himself, if the requestor 4 has set up the system to allow for this type of hiring. This is ideal in a situation where the requestor 4 may have one suitable driver 6 located in an area, but does not have information on additional drivers 6$n$. The lead driver 6 is contacted by the requestor 4, and then proceeds to invite additional drivers 6$n$ to use the mobile software application 18 and join the lead driver 6 on the job.

Similarly, a "trip manager" may be employed or otherwise retained by the requestor 4 to fill the roll, thereby removing steps from the requestor 4 and adding them to the trip manager. For example, the trip requestor 4 may set up a trip request and specify the target 8, but leave the assigning of drivers or drive teams to the trip manager.

Figure 2:
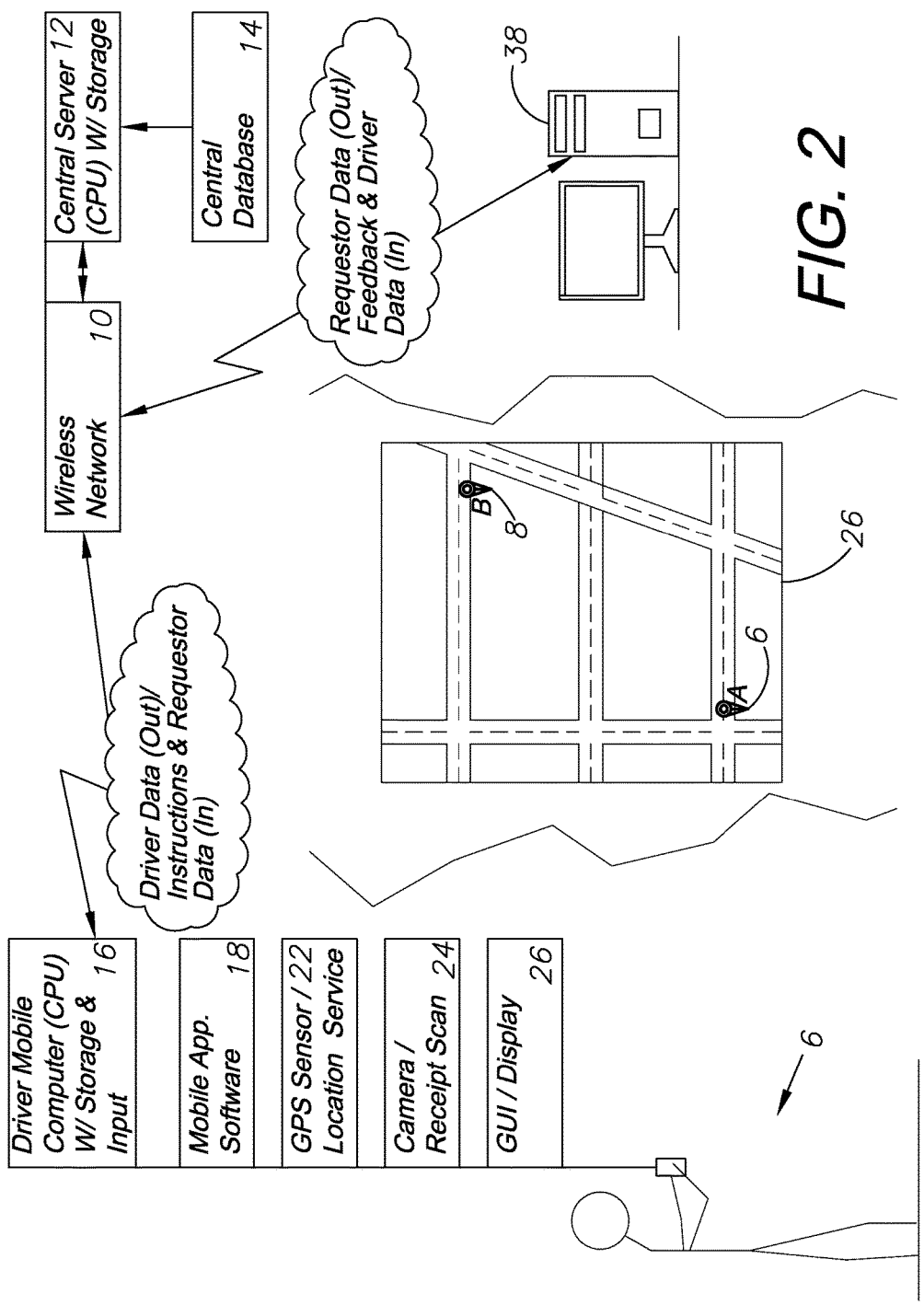
FIG. 2 is a diagrammatic representation showing in more detail the transfer of information amongst various elements of an embodiment of the present invention.

FIG. 2 shows in slightly more detail how data elements are transferred between the requestor's computer 38, the central server 12 and database 14, through the wireless network 10, and to a driver's 6 mobile computer 16. The data exchange is intended to link the requestor 4 with the best available drivers 6 that suit the requestor's 4 needs, while ensuring that drivers 6 are presented with optimal arrangements for picking up targets 8.

III. Method of Practicing a Preferred Embodiment of the Present Invention

Figure 3A:
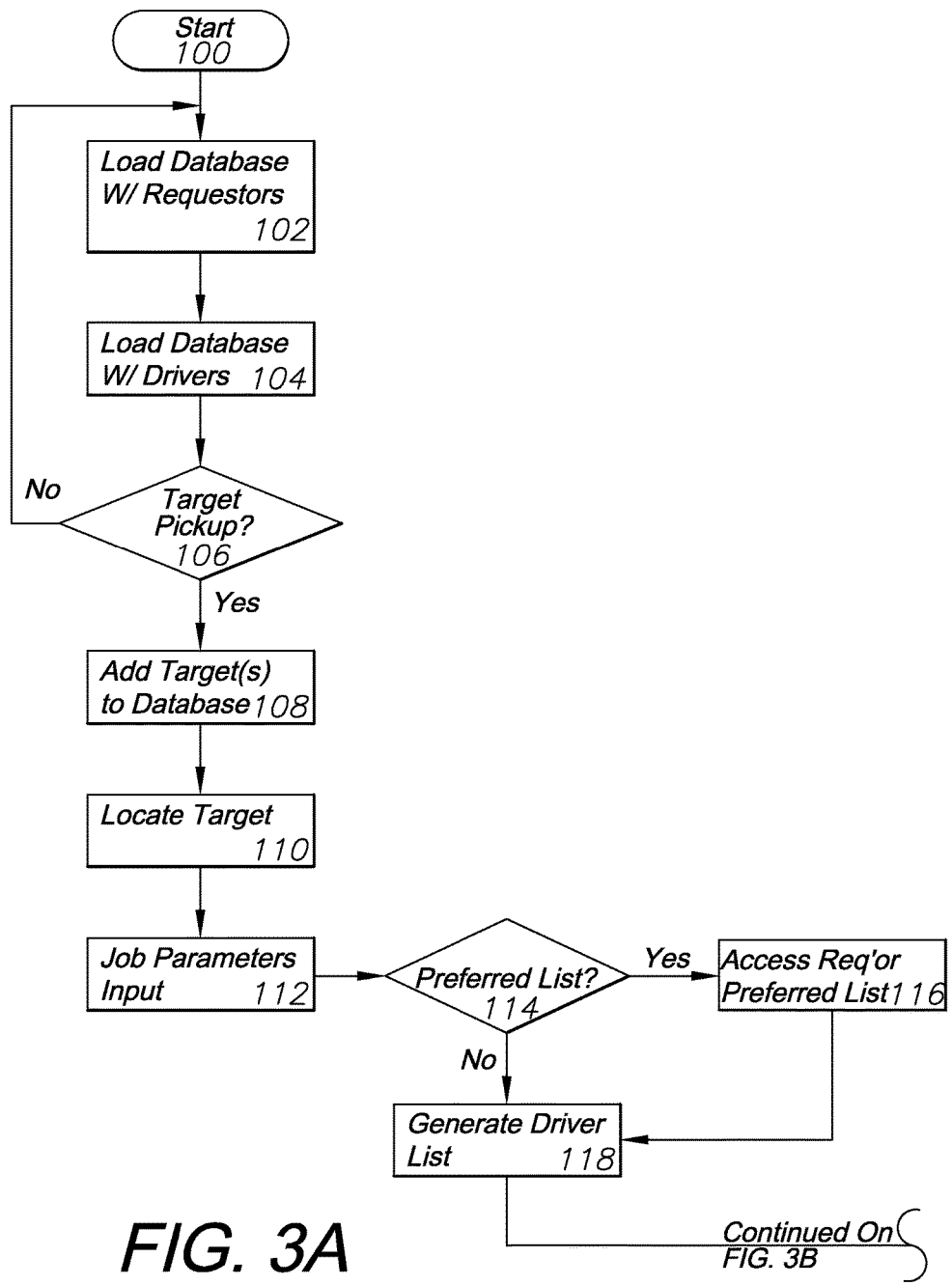
FIG. 3A is a first portion of a flow chart diagramming the step-by-step practice of a method embodying the present invention.
Figure 3B:
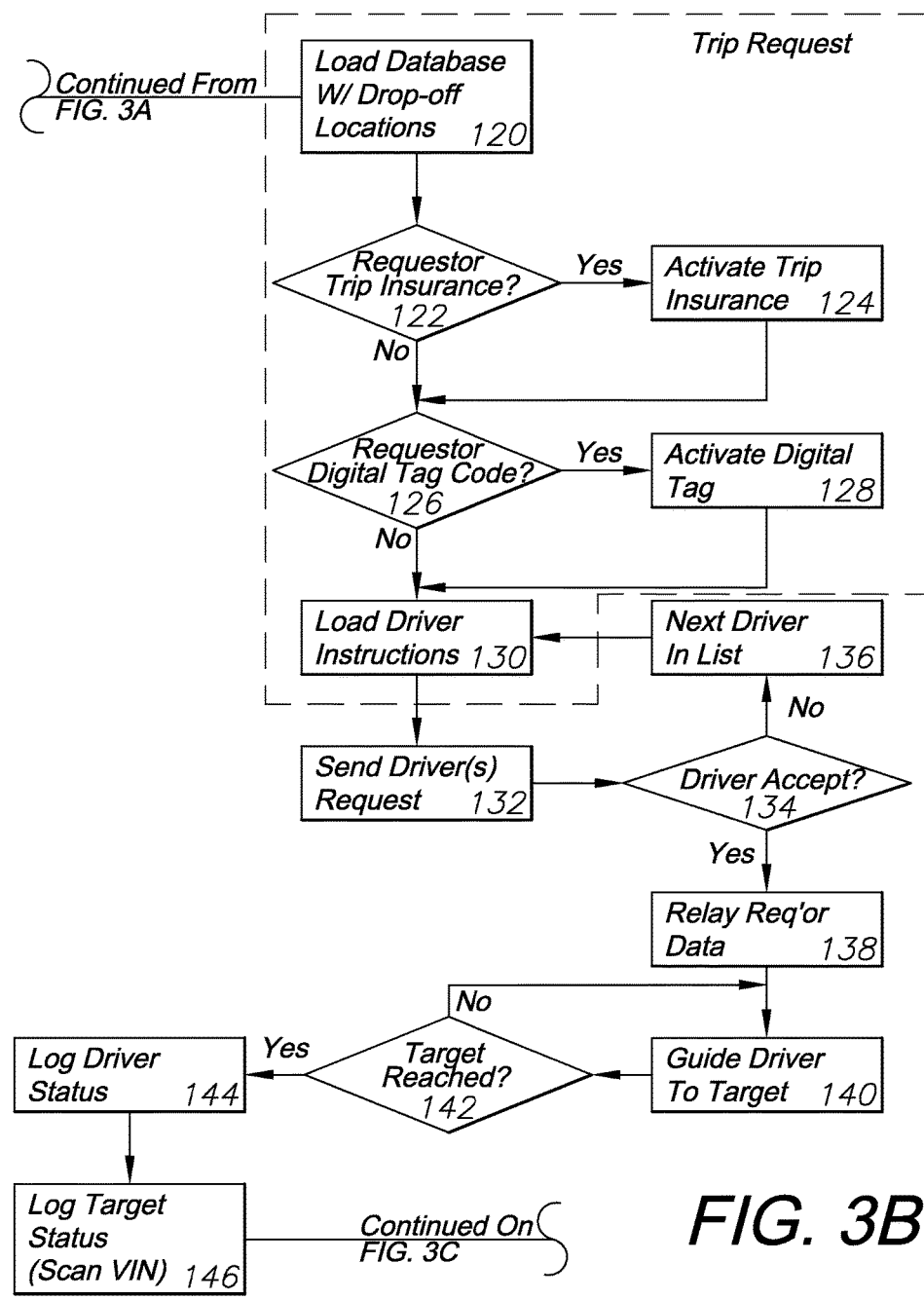
FIG. 3B is a second portion thereof.
Figure 3C:
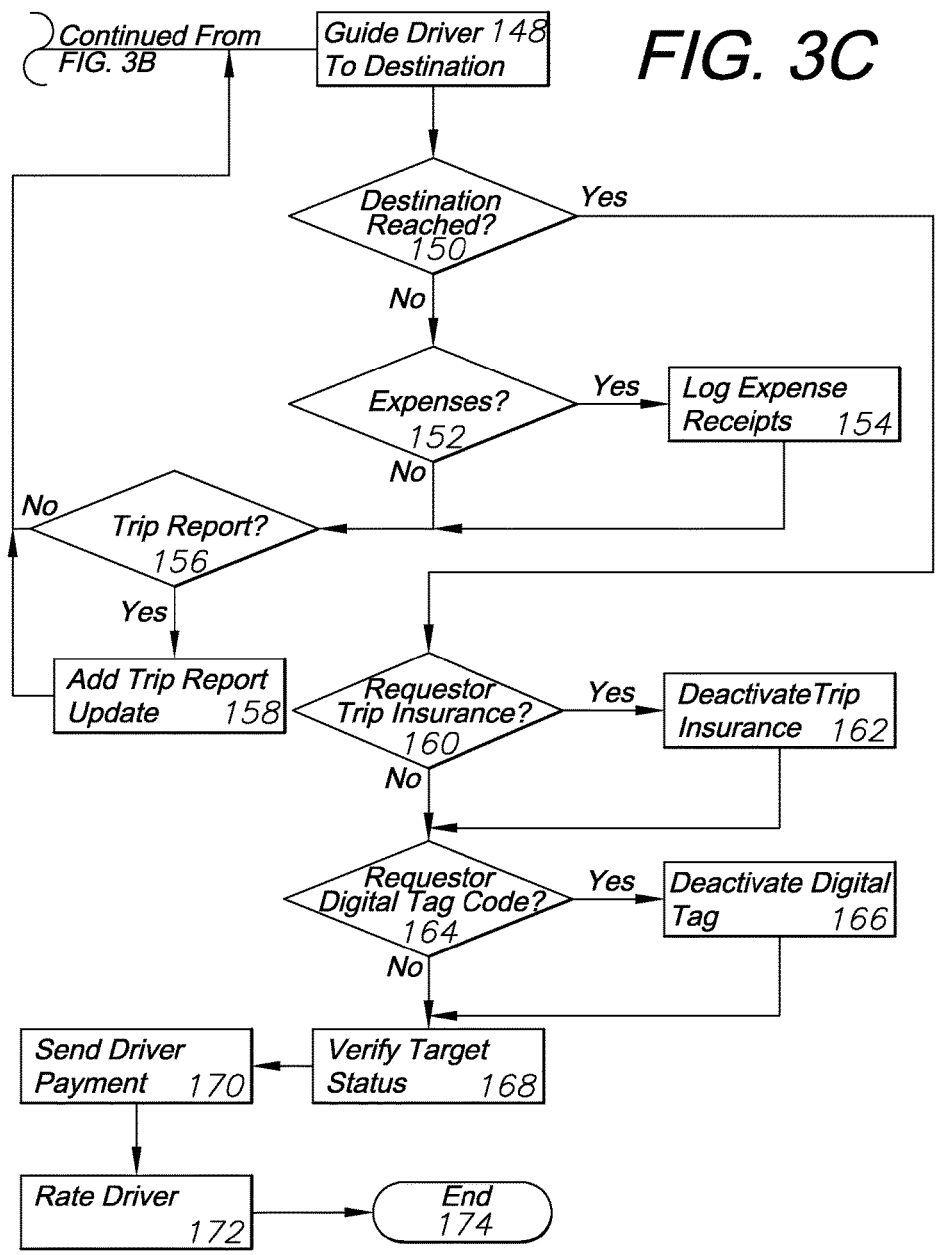
FIG. 3C is a third portion thereof.

FIGS. 3A-3C demonstrate a step-by-step method of practicing the present invention. It should be noted that these steps are not exhaustive of all of the steps that may go into the practice of the present invention, but instead represent one example of how the present invention may be practiced.

The method starts at 100 as shown in FIG. 3A. The central database 14 is loaded with requestors who have registered at 102, and is further loaded with certified drivers at 104. Third party companies who register for use of the present invention would similarly be loaded into the database.

A requester designates a target or targets to be picked up at 106. The target's information is then added to the database at 108. The system 2 locates the target at 110 and assigns geographical coordinates to the target which allows drivers, requestors, or other users to see where the target's present location is. The requestor may manually enter the target's location, or the information may be loaded by scanning a vehicle's VIN with a mobile computing device having GNSS positioning technology or other location equipment integrated into it.

Next the requestor will input various job parameters associated with the job at 112. This may include the type of target being picked up, the number of targets being picked up, the final drop-off location, the required date and time at which the target needs to be dropped off, various driver qualifications, or any other necessary job parameters that the requestor deems necessary to retrieve the target.

The requestor determines at 114 whether or not to select drivers or driver companies from a preferred list, or whether to allow the system 2 to generate a list of drivers based on job parameters and target location. If the requester chooses to use a preferred list of drivers, the system will access a list of preferred drivers at 116 that the requestor has previously set up based on previous jobs or previous work experience. Otherwise the system will generate a list based upon the job parameters. Either way, a list of drivers is generated at 118.

Figure 6:
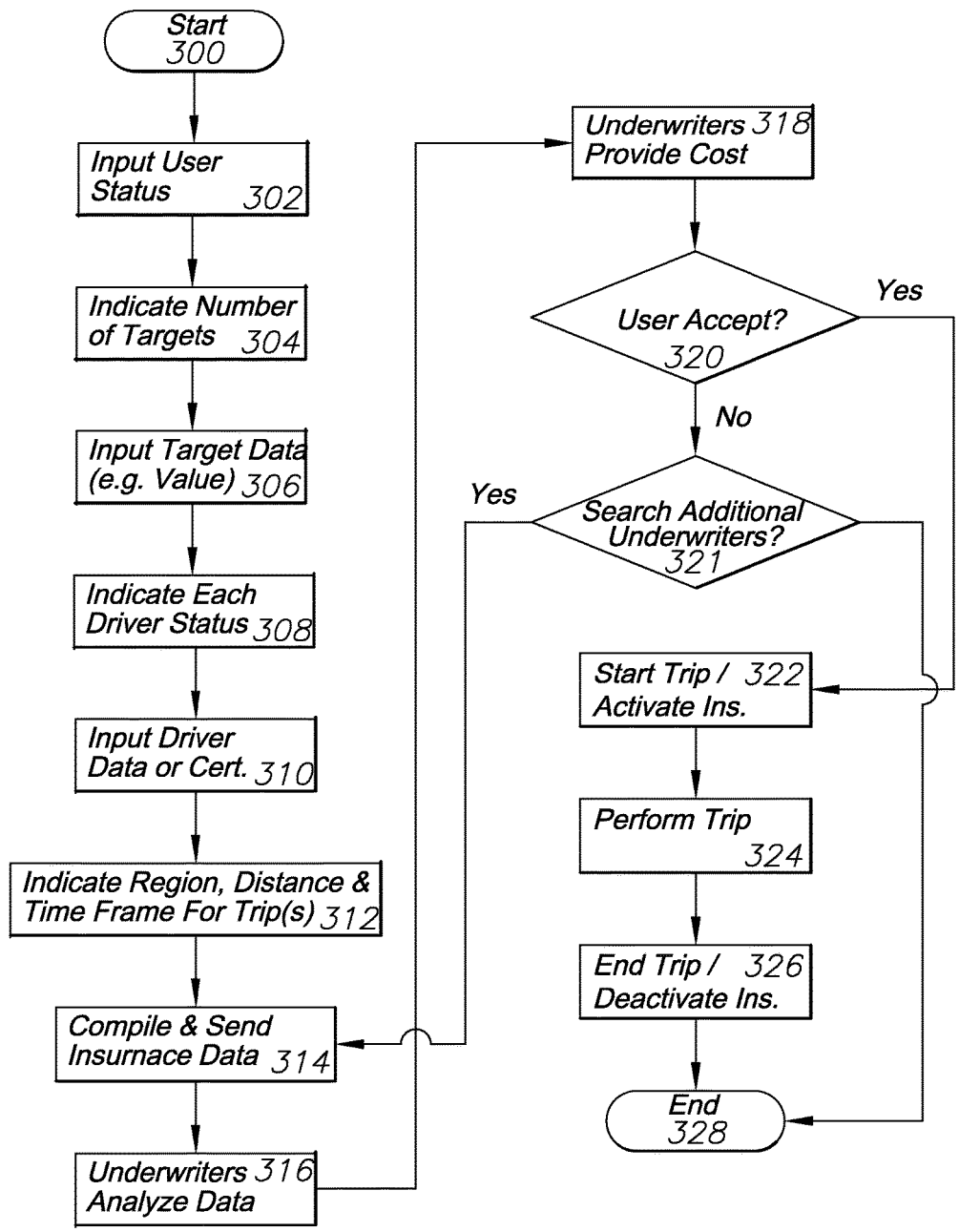
FIG. 6 is a flow chart diagramming the practice of a portion of a preferred embodiment of the present invention—namely, applying for, requesting, and obtaining single trip car insurance.

The list of steps of FIG. 3A is further continued in FIG. 3B where a trip request is generated. The system database is updated at 120 with drop-off locations related to the target or targets assigned for pickup by the requestor. If the requestor has trip insurance at 122, then the trip insurance may be activated at 124 if the requester decides to utilize the trip insurance. Typically, this trip insurance would function during the specified trip only and then would be deactivated. A cost would be generated based upon the job parameters, the target, the driver(s) involved, and other related details. More about the trip-by-trip insurance generation is discussed below and at FIG. 6.

Similarly, if the requestor has a digital tag (e.g. license plate) code, the requestor can choose to activate that code at 126. The code is activated at 128, and any driver who is ultimately used in the trip would need to have a digital license plate capable of receiving the digital license plate code. If multiple drivers are required, multiple plate codes may be needed.

Finally, all additional driver instructions are loaded into the system at 130 and the driver or drivers selected from the list generated at step 118 will be sent the driver instructions and other relevant details at 132. The driver or drivers are asked to accept the request at 134. If a driver rejects the request, the next driver in the list will be selected at 136. Alternatively, the system may be required to draw on drivers outside of the generated list once that list is exhausted.

Once the necessary number of drivers has accepted the trip request, any additional data will be relayed to the driver(s) and notification that the driver is "on the job" is sent at 138. The driver may be guided to the target's location at 140 using maps or step-by-step directions determined by the driver's mobile computer 16. A check is performed at 142 whether the driver has reached the target. Directions are provided at 140 until the target is reached at 142. The driver's status that the target has been reached is logged at 144, and the target's status is also logged at 146. This step includes scanning a VIN for a vehicle, photographing the target for damage, odometer reading, or other relevant details, or otherwise inputting details about the target's condition into the driver's mobile computer. All of this information is saved in the central database 14 and is uploaded to the requestor 4 and any third party users who have access to view this information, such as the ultimate purchaser of the target from the requestor.

The list of steps of FIG. 3B is further continued in FIG. 3C where the driver is guided to the drop-off destination at 148 using the driver's mobile computer 16. The system constantly performs a check to determine whether the destination has been reached at 150. If the destination has not been reached, the driver has the opportunity to log expenses at 152. Expenses are logged at 154, and may include hotel stays, food, fuel, vehicle repairs, insurance costs, or any other relevant details. These may be input using a camera attached to the mobile device photographing receipts, or the data may be entered manually.

Whether or not expenses are incurred, the driver will periodically be requested to input trip reports at 156. If the driver decides to add a trip report, the trip report update is added at 158. Trip reports include changes to the status of the target, key destinations reached, updates in estimated time of arrival, or any other detail that is deemed relevant. This information is transferred on to the requestor and may also be viewable by third party users.

This cycle is repeated until the destination is reached. If trip-by-trip insurance was used, it is detected at 160 and is deactivated at 162, rendering the insurance finalized. Similarly, if a digital tag code belonging to the requestor is detected at 164, that code is deactivated at 166, rendering the tag useless until a new code is detected.

The status of the target is verified and logged at 168, ensuring that the quality and other relevant details of the target are satisfactory to the requestor and/or to a third party buyer. If everything is satisfactory, payment is automatically wired through the system from the requestor to the driver at 170. Payment may be automatically withdrawn from the requestor's payment account 46 and into the driver's bank account. Expenses incurred during the trip would also be reimbursed through this payment.

Finally, the requestor and other third parties have the opportunity to assign a rating to the driver at 172. This may also include assigning the driver to a "favorite" or "preferred" driver's list, if the driver is not already on such a list. Alternatively, the driver may be removed from the list for poor performance. The practiced method ends at 174.

As indicated above, this is a mere example of how someone may practice an embodiment of the present invention. Steps may be skipped or added in actual practice of the present invention. Necessary steps may have been omitted to simplify the disclosure of the method of practicing the present invention, but those steps would be included in the actual practice of the invention.

IV. Driver Certification Process

Figure 4A:
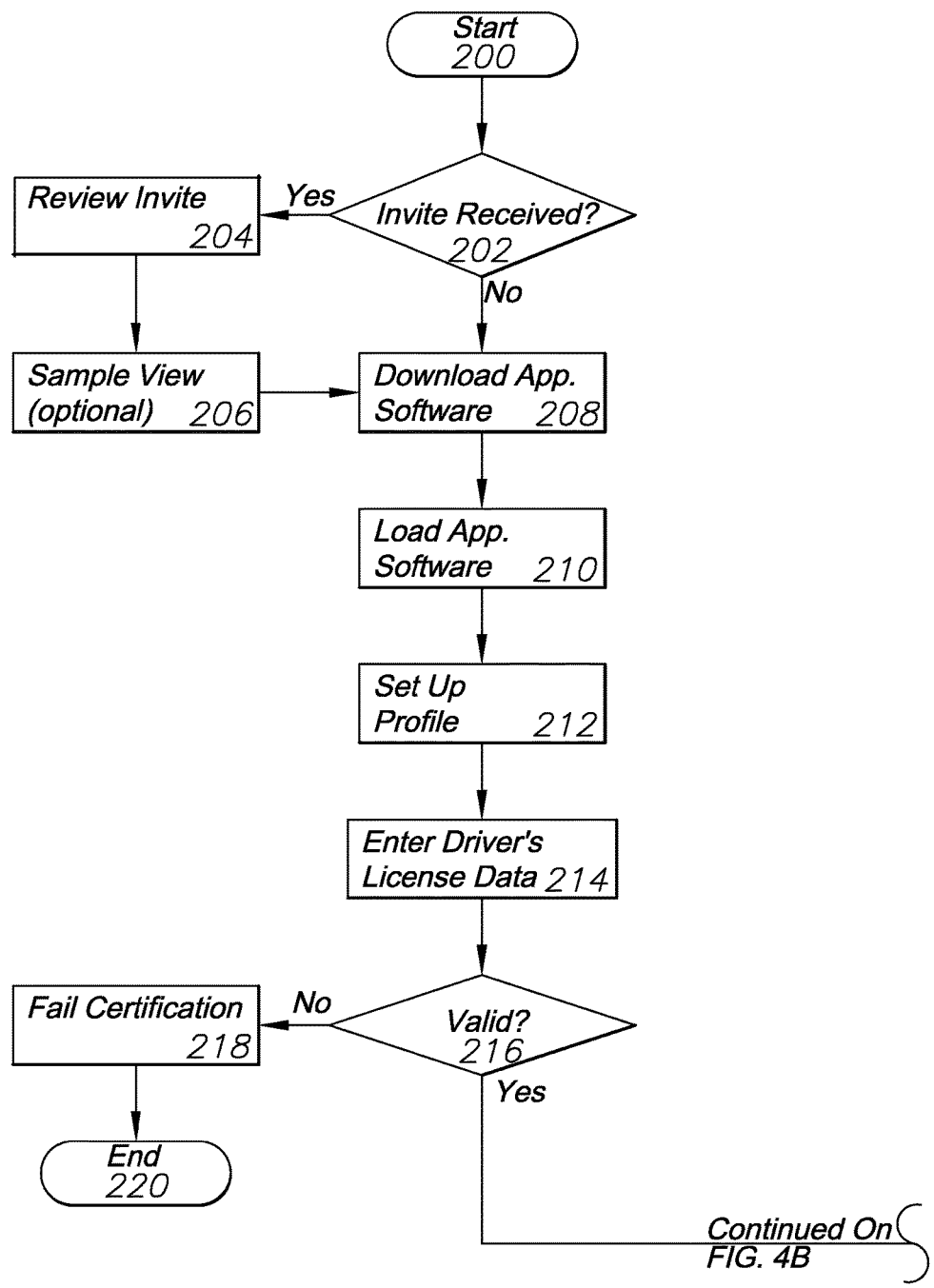
FIG. 4A is first portion of a flow chart diagramming the practice of a portion of a preferred embodiment of the present invention—namely, driver certification through use of the present invention.
Figure 4B:
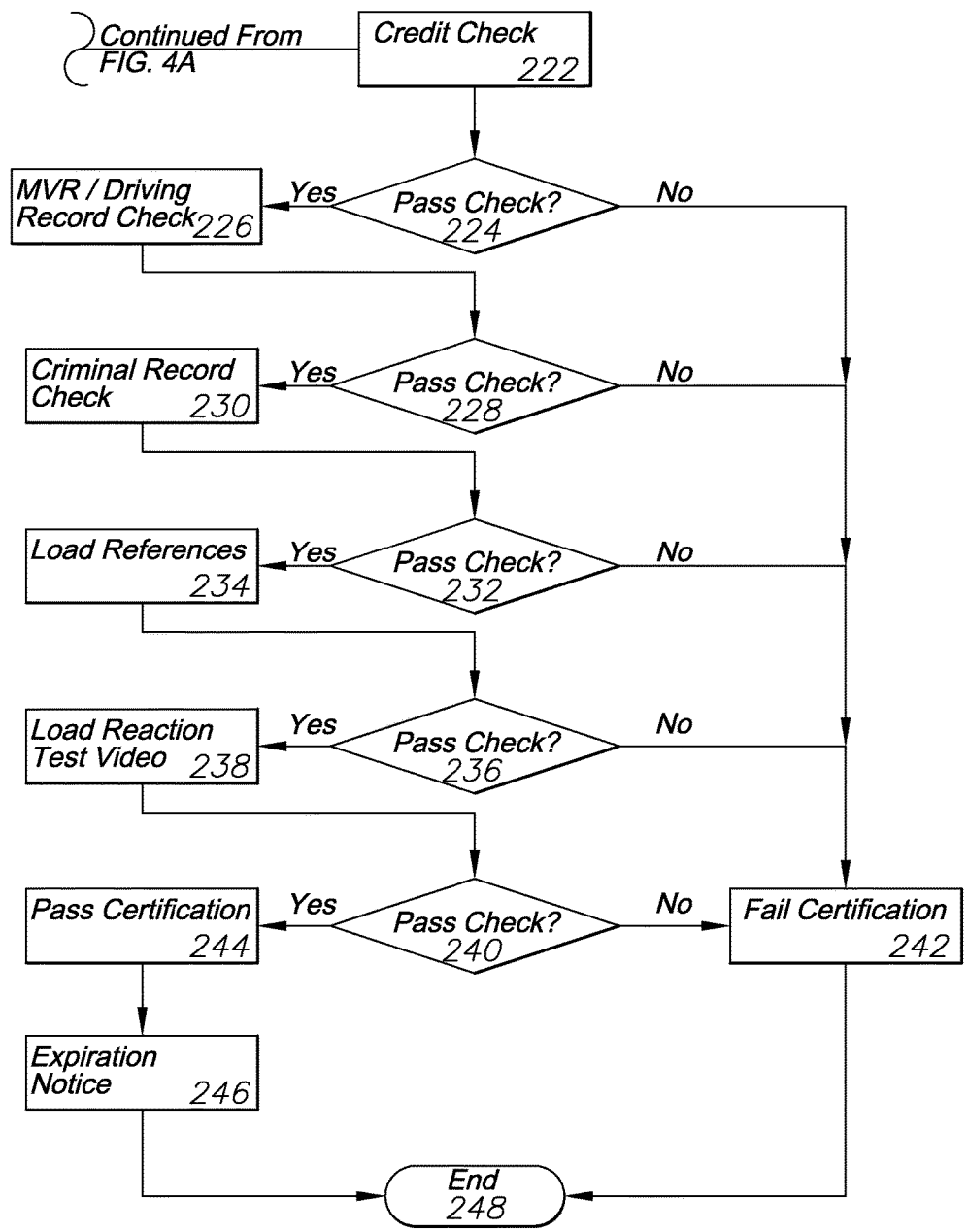
FIG. 4B is a second portion thereof.

FIGS. 4A and 4B demonstrate a step-by-step method of practicing an element of the present invention, namely: certifying a driver with the driver allocation system through the driver allocation service 5. The certification process starts at 200 with a driver who has a mobile computer device 16 which satisfies the requirements of the driver allocation system as outlined previously at FIG. 1.

Step 202 indicates that a driver may be invited to use the software associated with the driver allocation system by a third party or another driver who already has access to the system. As discussed above, the software allows a driver to interact with the driver allocation service 5 and various requestors/dealers. A driver who has access to these features may send a message to another driver who is not yet certified and registered with the driver allocation system. If the invite is received at 202, the driver may review the invite at 204 and may also have the option of viewing a sample of the system at 206. The sample view would be the actual results of a trip performed by the third-party driver or requestor who sent the initial invitation to the driver at 202.

Whether or not an invite has been received, the driver must download the associated application software at 208 in order to become certified within the driver allocation system 2. This requires access to a wireless network with the driver's mobile computer and downloading of the application software to the data storage element of the mobile computer. The application is then loaded onto the mobile computer device at 210, at which point the driver may set up their user profile at 212. This user profile is discussed in more detail elsewhere, but generally includes the name and location of the driver, the driver's experience, the driver's preferred job types, and other relevant information about the driver.

The certification process is intended to ensure certainty in the quality of drivers available for hire by various requestors and other parties. Therefore, the most important features of the certification process revolve around the driver's driving history. The first step in certifying the driver's history is to enter the driver's license data at 214, which may include the license number, the date of expiration, the date acquired, and the state where the license was obtained. This data is transmitted to the central server via the wireless network and a check is performed at 216 to determine whether the license data is valid. If the check comes back as "not valid," the certification process is immediately failed at 218, and the certification process ends at 220. If the driver's license data is valid, additional checks are performed for certification.

First, a credit check is performed at 222. Again, a check is performed by the central server computer to determine whether the driver passes the credit check at 224. If not, certification fails at 242 and the process ends at 248.

These checks continue: A check of the driver's motor vehicle/driving record occurs at 226 and pass/fail is determined at 228; a criminal record check is taken at 230 and pass/fail is determined at 232; references are loaded into the system by the driver at 234 (such as character references or employment references) and a check of whether these have successfully been uploaded and/or approved occurs at 236. This check may occur later and be done manually by a person grading the references, or the check may simply be whether or not such references were uploaded.

A video reaction test is accessible via the application software. The driver may choose to activate this test at any time, and the test is loaded at 238. The test goes through a video program on the driver's mobile computer via the GUI display, and the driver will react to various elements of the video test. The results of the test will be analyzed by the central server, and a pass/fail check is taken at 240. As with the other checks, if any pass/fail check indicates failure, the certification process fails at 242 and ends at 248. If each and every check is passed, then the driver is notified that they have passed certification at 244. An expiration notice is provided to the driver at 246. This expiration notice tells the driver how long their certification is good for. The driver will be required to recertify at the expiration of the certification. The certification process ends at 248.

Certification ensures that not just any one can be registered with the driver allocation service 5. The certification process provides a pool of drivers which requestors, dealers, and other parties can be confident will be able to safely and reliably transport the target item, such as a vehicle, to a target destination. This process will also be necessary to insurance underwriters who are providing trip-by-trip driving insurance to the drivers and/or the requestors.

As indicated above, this is a mere example of how someone may practice an embodiment of the present invention. Steps may be skipped or added in actual practice of the present invention. Necessary steps may have been omitted to simplify the disclosure of the method of practicing the present invention, but those steps would be included in the actual practice of the invention.

V. Third-Party Transport Company Registration Process

Third party driving companies, such as those discussed above in relation to FIG. 1A, may register with some version of the driver allocation system 3. These parties have contact with multiple drivers, who would also have to be individually registered and certified with the driver allocation system 3 through use of mobile computing devices linked to the driver allocation service over a wireless network.

Figure 5:
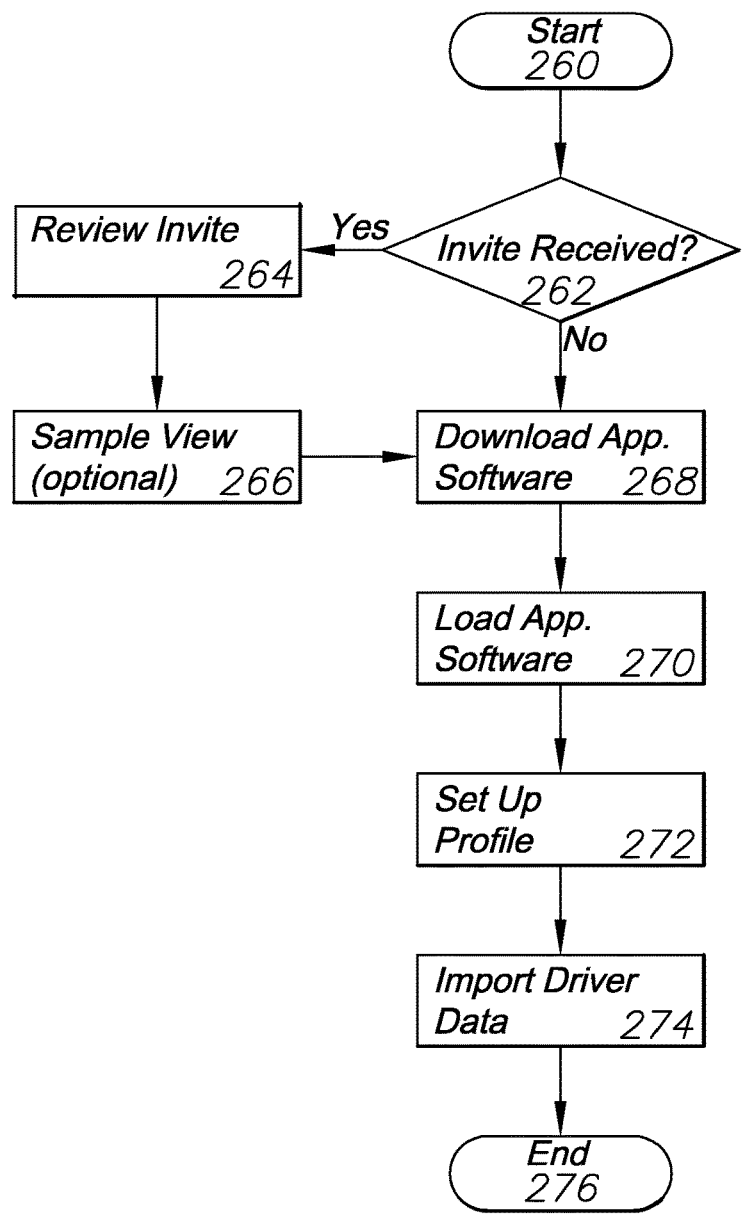
FIG. 5 is a flow chart diagramming the practice of a portion of a preferred embodiment of the present invention—namely, registering a company through use of the present invention.

FIG. 5 demonstrates a step-by-step method of practicing an element of the present invention, namely: registering third-party driving companies with the driver allocation system 3 as depicted in FIG. 1A.

The process starts at 260. A driver, requestor, or other party who has access to these features may send a message to a third-party driving company who is not yet certified and registered with the driver allocation system. If the invite is received at 262, the driver may review the invite at 264 and may also have the option of viewing a sample of the system at 266. The sample view would be the actual results of a trip performed by the third-party driver or requestor who sent the initial invitation to the company at 262.

Whether or not an invite is received, the third-party company may download the appropriate application software at 268. This software may be downloaded to a mobile computing device similar to those used by the various drivers discussed above (e.g. "smart phone" devices). The software may also be downloaded to a stand-alone personal computer (e.g. laptop or desktop computer). The software application is loaded at 270 and a profile is set up for the third party company at 272. This includes all relevant details of the company, including the general region where the company operates, how many drivers the company has at its disposal, the company's Federal Employee Identification Number (FEIN), Dunn & Bradstreet Number (D&B), licenses, and other relevant features of the company.

Driver data of the individual drivers hired by the company may be input at 274. This can include a large dump of data collected by the driving company on behalf of all of its drivers which would be similar to the process discussed above and at FIGS. 4A and 4B. Otherwise the individual drivers may perform these steps individually and then merely sign up with the driving company at a later date.

The process ends at 276. As indicated above, this is a mere example of how someone may practice an embodiment of the present invention. Steps may be skipped or added in actual practice of the present invention. Necessary steps may have been omitted to simplify the disclosure of the method of practicing the present invention, but those steps would be included in the actual practice of and embodiment the invention.

VI. Trip-by-Trip or Single-Trip Insurance Process

Another novel feature which goes hand-in-hand with the basic concept of the driver allocation system 2 discussed above includes a trip-by-trip specific insurance feature. This feature allows drivers, third-party companies, and requestors to apply for and receive insurance limited to a single trip as set-up through the driver allocation system. Several features come into play in order to create and obtain this insurance, so a preferred embodiment would include a method where this insurance is procured from third-party insurance underwriters through the use of the driver allocation service 5.

The process for obtaining single-trip or trip-by-trip insurance starts at 300. The user's status is input at 302. This includes identifying the user as a driver, a dealer or otherwise a requestor, a third party company, the auction site claiming the target, or some other party.

The number of targets to be transported is entered at 304. If multiple targets can be driven in one vehicle, then only a single source of insurance may be necessary. However, if each target comprises a separate vehicle, multiple instances of single-trip insurance will be required. The value of each target is input at 306. The status of each driver to be used is input at 308 (e.g. the name and other profile data of each driver). The driver's data or certification status is input at 310. The region, time frame, and other trip information is input at 312. All of this data is used by the insurance underwriter to determine the risk of the particular trip and therefore formulate a cost for that insurance.

The data is compiled and sent at 314 and analyzed by the underwriters at 316. The underwriters would come up with an estimated cost for the insurance, as well as other data relevant to the insurance for that particular trip (e.g. deductible amount). This cost is sent to the user at 318. The user must accept or reject the insurance offer at 320. If the user rejects the offer at 320, the user will have the opportunity to search additional underwriters at 321 for additional insurance quotes. If the user elects to send the request to additional insurance underwriters, the data is re-compiled and sent at 314, analyzed by the new underwriter at 316, and a cost again is provided to the user at 318.

If the user elects not to accept the insurance at 320 and not to search additional underwriters at 321, the insurance request process ends at 328.

If the user does accept the insurance at 320, then the insurance is activated as the trip is started at 322. The trip is driven by the relevant driver(s) at 324, until the target destination is reached at 326, where the insurance deactivates automatically. The process ends at 328.

This step-by-step demonstration simply discusses the way the single-trip insurance is procured. It does not indicate in detail how a claim will be made in the event of an accident. The insurance claim procedure would largely proceed in the way that typical insurance claims are made, pending the details included in the underwriter's proposal to the user.

As indicated above, this is a mere example of how someone may practice an embodiment of the present invention. Steps may be skipped or added in actual practice of the present invention. Necessary steps may have been omitted to simplify the disclosure of the method of practicing the present invention, but those steps would be included in the actual practice of and embodiment the invention.

Figure 6A:
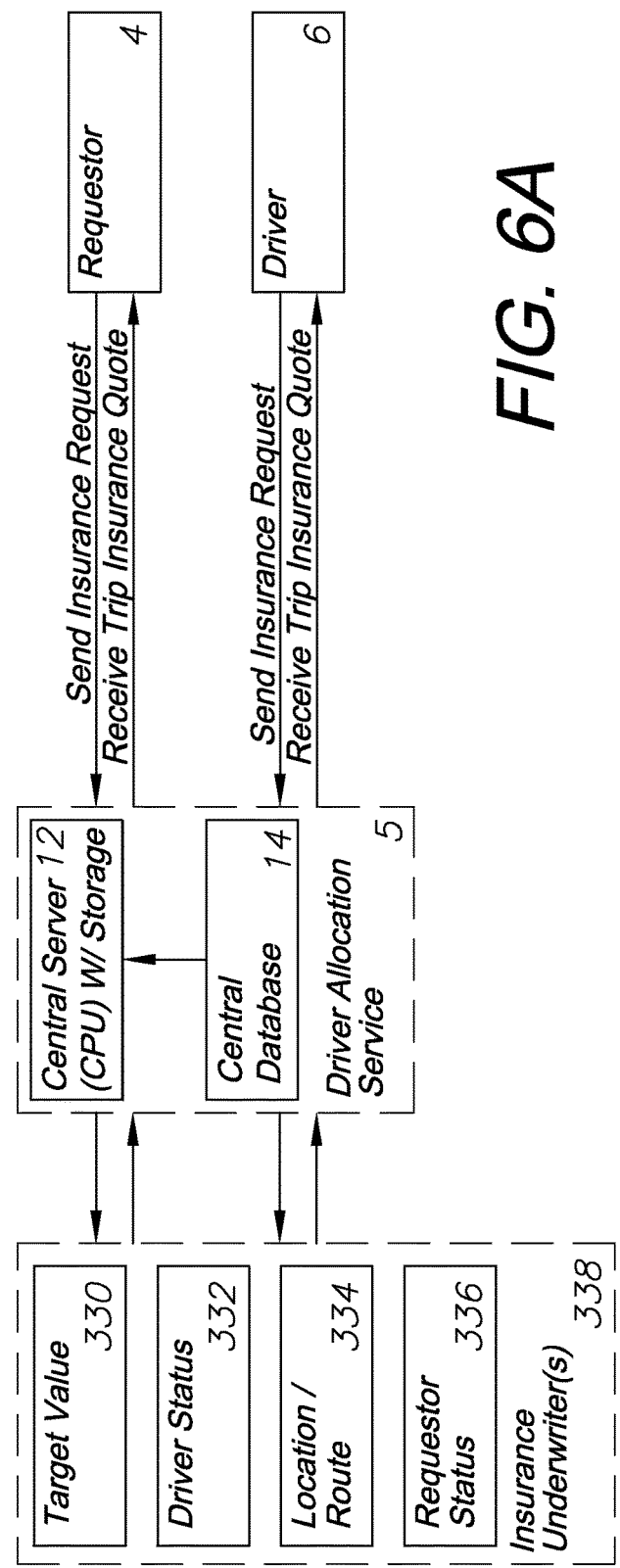
FIG. 6A is a diagrammatic representation of the relationships between various elements thereof

FIG. 6A diagrammatically shows the relationship between drivers 6, requestors 4, the driver allocation service 5, and the insurance underwriter(s) 338. Data including target value 330, driver status 332, location/route 334, and the requestor's status 336 are optionally sent to the central server 12, which are then relayed to the insurance underwriter 338. The underwriter reviews the data and returns a quote to the requestor or driver requesting insurance. As above, other parties could also procure insurance, such as the ultimate purchaser of the target 8.

VII. Digital Tag/License Plate Element 28, 428

Figure 7:
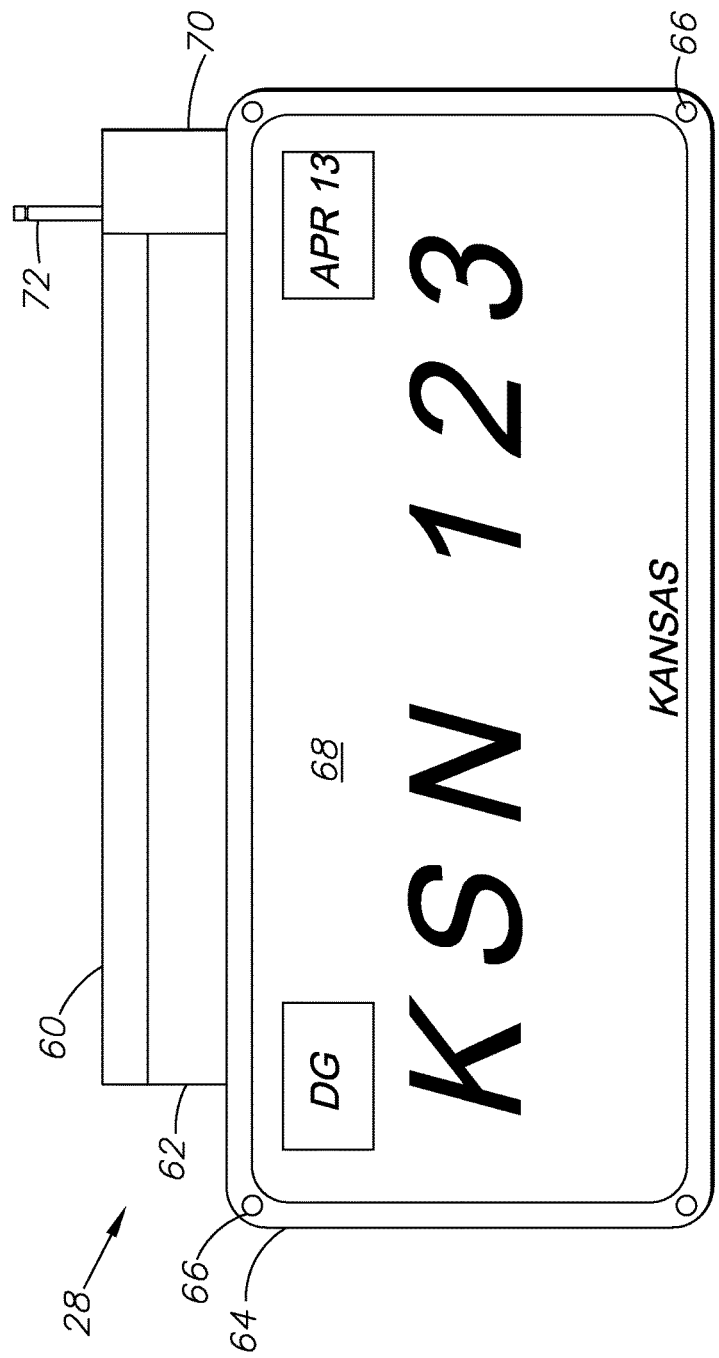
FIG. 7 is an elevational view of a digital license tag plate which may be incorporated into the practice of an embodiment of the present invention.

FIGS. 7 and 7A demonstrate two alternative embodiments of a digital license plate which may be used as part of the driver allocation systems discussed herein. FIG. 7 shows a preferred embodiment digital license plate 28 which generally includes a frame 64 with mounting holes 66 which allow the frame to be mounted to a vehicle via mounting screws like a typical license plate. A digital screen 68 is located in the frame, which contains information such as the license plate number, the expiration date (and time) of the digital plate, and the state, county, and other necessary information.

Each license plate requires a power source. A preferred embodiment would use a lithium-ion battery 62 connected to a solar array 60 for powering and recharging the tag license plate. The license plate battery may also be recharged by plugging it into a power outlet with a standard adapter (not shown). Other options include plugging the license plate directly into the vehicle's power system, either directly or through a removable wire with a universal serial bus (USB) port or other outlet plug.

Each license plate will also include a microcomputer 70 including a CPU, data storage element, and external connectors such as USB. A Wi-Fi and/or Bluetooth antenna 72 is used to communicate data to and from a mobile computing device associated with the license plate, such as the driver's 6 mobile computer 16. This allows data to be transmitted over the wireless network to the driver's mobile computer 16, and wirelessly re-transmitted to the digital tag. A digital drive-away plate code 42 sent by a requestor 4 will therefore be associated with the digital license plate 28 and the display will show the necessary information.

FIG. 7A shows an alternative embodiment digital license plate 428 which is affixed to the rear window of a car via four suction cups 466. The display 468 shown here is a light-emitting diode (LED) board with a plurality of large 474 and small 472 LED lights for displaying simple yet informative displays. The display must at least be able to show alphanumeric license plate codes and the associated city and county information.

This alternative embodiment also shows a toll-paying device 476 which may receive additional codes for use with automatic toll stations used around the country, such as E-ZPass provided by the E-ZPass Interagency Group of Wilmington, Del. As with the digital license plate itself, the code for these passes would be transmitted to the device via the driver's mobile computer, and would expire at the end of the trip. This toll-paying communications device 476 could alternatively be included in the driver's mobile computing device 16. Charges could automatically be sent to the Requestor's account, or any other party's account, as the toll fees are paid through the toll-paying device 476.

The digital plate 28, 428 will tie itself to the mobile computing device 16 of the driver and will key off of digital plate codes being relayed through the mobile computing device. If signal is cut off from the mobile computing device, the digital tag may either be cut off as well or may optionally run based upon the last set of instructions it had received (e.g. when to expire).

The above-mentioned features could be interchanged with various alternative arrangements, and may include other functional means of power, display, communication, etc. These license plates could be useful in several industries, including for use in test drive scenarios, rental car services, or for one-time rental by a single driver. These license plates should function interstate, and may optionally belong to any individual in the chain, including the individual drivers, the driving companies, or the purchaser of the target.

Requestors who are automobile dealers will be allowed to assign the digital plate devices to their personnel, who may obtain permission for drives (including test drives) by allowing their managers to assign a limited license plate/tag code for a specified time frame. At the expiration of that time frame the digital plate code will expire, regardless of the location of the vehicle or plate.

The display of the license plate may also show what type of drive is being performed with the vehicle associated with the plate. For example, the tag may indicate that the vehicle is currently "in transit" delivering a target or the vehicle itself to a designated location. The tag may also indicate a "test-drive" for use with automobile dealers, or a "one-way delivery." Other types of trips may also be displayed, such as if the vehicle is being used as a taxi service or chauffer. The display can display as much detail about the trip as the requestor or driver determines is necessary, or to comply with state law.

The display may also feature the time remaining on the duration of the digital tag, and when the tag code expires the display will either go blank or display "EXPIRED" or a similar message across its face.

VIII. Driver Allocation Service 5 User Interface

FIGS. 8A-8G demonstrate several features of a user interface associated with the driver allocation service 5 that would be included in the software associated with a driver's mobile computer device 16, the requestor's computer 38, or any other party's computer when utilizing the features of the present invention.

Figures 8A, 8B:
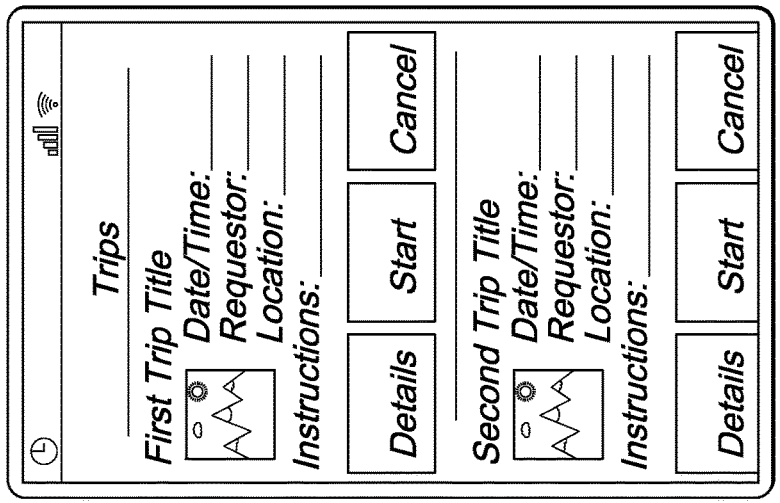
FIG. 8A is a screenshot of a user interface associated with the practice of a preferred embodiment of the present invention, showing a driver's user interface for accessing the various features associated with the present invention.
FIG. 8B is a screenshot of a user interface associated with the practice of a preferred embodiment of the present invention, showing scheduled trips associated with a driver's itinerary.

FIG. 8A for instance shows a user interface of a driver's "dashboard." This view would be the first view a driver would see when opening the associated software application on his or her mobile computing device. Any and all features that the driver would need to interact with the driver allocation system, including the driver allocation service 5, can be linked to from this view. For example, the driver may update his driver profile by selecting the "Profile" link on the dashboard.

FIG. 8B shows a user interface of a driver's itinerary, including details about upcoming trips and the option to begin a trip or to cancel a trip. Additional details about the trip, such as details about the target, can be found by selecting the "details" tab.

FIG. 8C shows a user interface of a driver's trip status. The driver may select or deselect various options during a trip. At the beginning of a trip, the driver may scan or manually input the VIN. The license plate number may be entered manually or retrieved from a drive-away license plate code sent by a requestor. The miles of the trip may be calculated using GNSS positioning or otherwise calculated. The driver may even designate his vehicle as the "target car" or the "chase car," depending on the driver's actual status. Each trip request is customizable, and may feature a unique task list.

FIG. 8D shows a user interface of a requestor's trip status. There are various options available for setting up a trip request, such as which drivers will be asked to perform the trip and the duration for the request to stay alive before responses are needed.

Figure 8F:
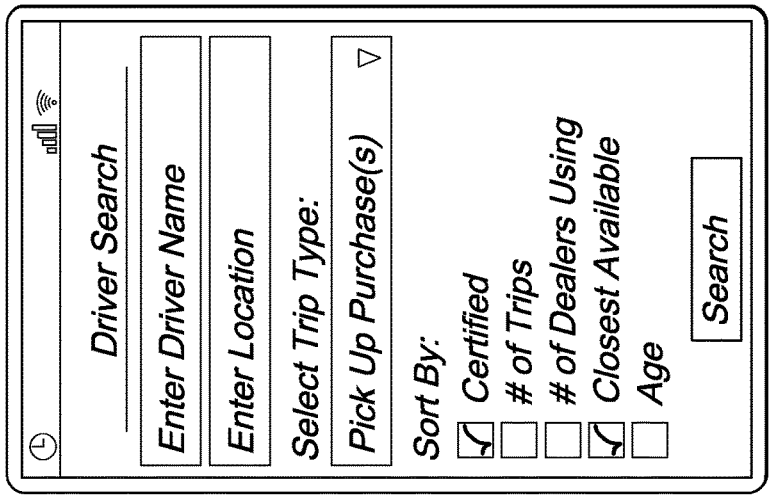
FIG. 8F is a screenshot of a user interface associated with the practice of a preferred embodiment of the present invention, showing a driver search function performed by a requestor.
Figure 8E:
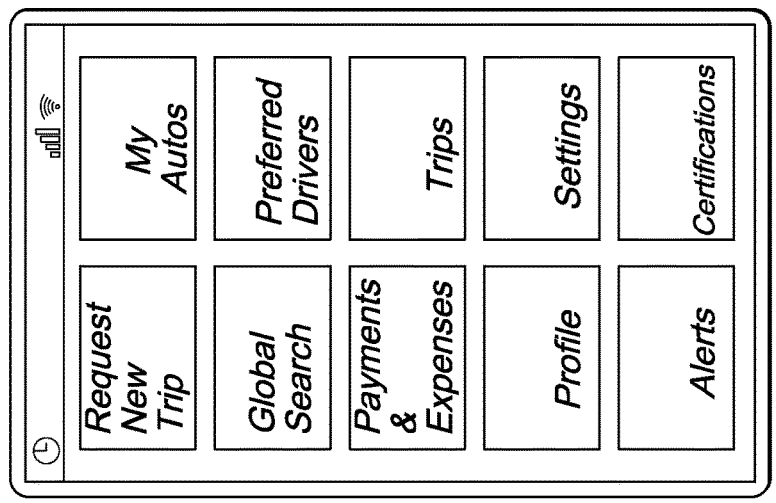
FIG. 8E is a screenshot of a user interface associated with the practice of a preferred embodiment of the present invention, showing a requestor's user interface for accessing the various features associated with the present invention.

FIG. 8E shows a user interface of a driver's "dashboard." As with the driver, various options are available to the requestor at this point.

FIG. 8F shows a user interface of a driver search by a requestor. This shows even more detailed options available to a requestor than those shown in FIG. 8D, such as the ability to search directly by a known driver's name.

Figure 8G:
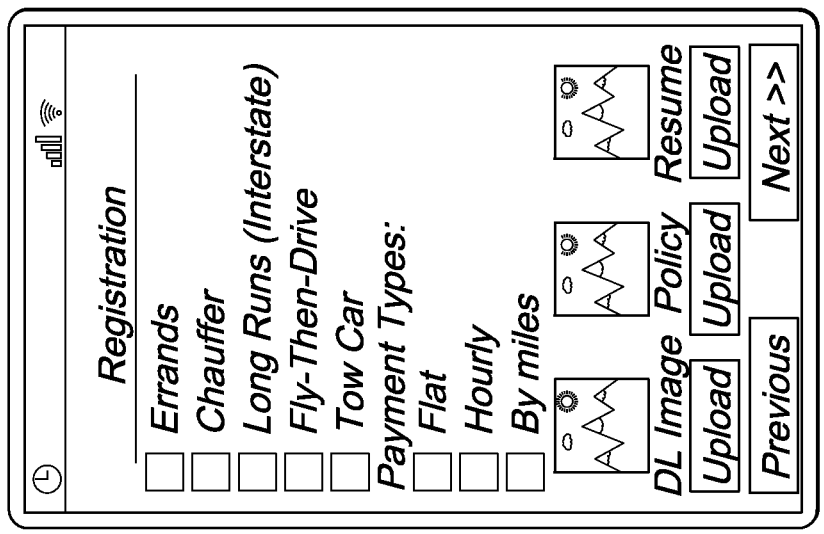
FIG. 8G is a screenshot of a user interface associated with the practice of a preferred embodiment of the present invention, showing a driver's registration options.

FIG. 8G shows a user interface of a driver's registration. This registration could also be submitted by a third-party driving company on behalf of its drivers. The driver can input details about what types of jobs he would be willing to perform, and may upload driver's license information, a resume, an insurance policy, and other relevant documents. Everything uploaded would be stored in the central database and be accessible by requestors searching for drivers.

In addition to the above, each trip may be associated with a unique code. Third parties, such as the buyer or seller of the target, may access the driver allocation service 5 via their own computer or mobile smart device. These parties would need to be invited to track the trip progress by the Requestor, the Driver, or another party who is controlling the trip and delivery. These parties would only receive minimum information about the trip, such as where the driver and/or target are located at a given time, and when the target arrives at its destination. Multiple targets could also be tracked by individual or multiple third parties in this way.

Other uses of the present invention which are not described in detail above but remain possible include a rental delivery service. A driver 6 or team of drivers can deliver a rental car or truck to a target location. The vehicle may be packed with supplies or instructions per a trip request set up using the driver allocation system 5. The target or vehicle may be upsold on a commission basis. The driver or other party may e-sign contracts on a mobile computing device 16, and leave the target at the location. The party receiving the target (e.g. the renting party) may e-sign using the driver's mobile device 16.

In such a scenario, the requestor 4, likely a vehicle dealer, creates a trip request using the driver allocation service 5. An option is available to create a "rental customer." A reservation and/or confirmation identification number is generated by the central server 12 and sent to the requestor and/or the renting party. The identification number is tied to the customer's name, delivery address, phone number, and other information. An option for providing additional supplies that the renting party requests may also exist. This may require data to be sent from the renting party to the requestor prior to the transaction, or in response to the requestor's initial generation of the trip request.

The rental customer may access the driver allocation service 5, or an alternative service, using a desktop or mobile computing device. The trip status of the vehicle may be monitored by the rental customer, and may indicate via the service when they have reached the target vehicle, or conversely, when the vehicle reaches them. A check-list may pop-up on the display of the rental-party's computer. Examples of tasks to be checked off include recording the fuel level, odometer, and status of the vehicle, including damage to the vehicle. These recordings can be made by taking pictures of gauges or vehicle damage and sending them via the computer network to the allocation service and/or the requestor.

The rental customer may also be prompted via the allocation service to purchase supplies, insurance, and other optional features, and may designate additional authorized drivers to drive the rental vehicle. The customer may e-sign accepting payment of these options using their computer and send this information to the requestor. Payment may also be sent over the computer network by tying directly into the customer's payment account. The customer would likely indicate their trip status via the same allocation service as they drive the vehicle from a starting location to a target location or temporary stop. All of this information would be sent back to the dealer who may monitor the location of their vehicle at any time.

IX. Secondary Trip ID System 402

Figure 10:
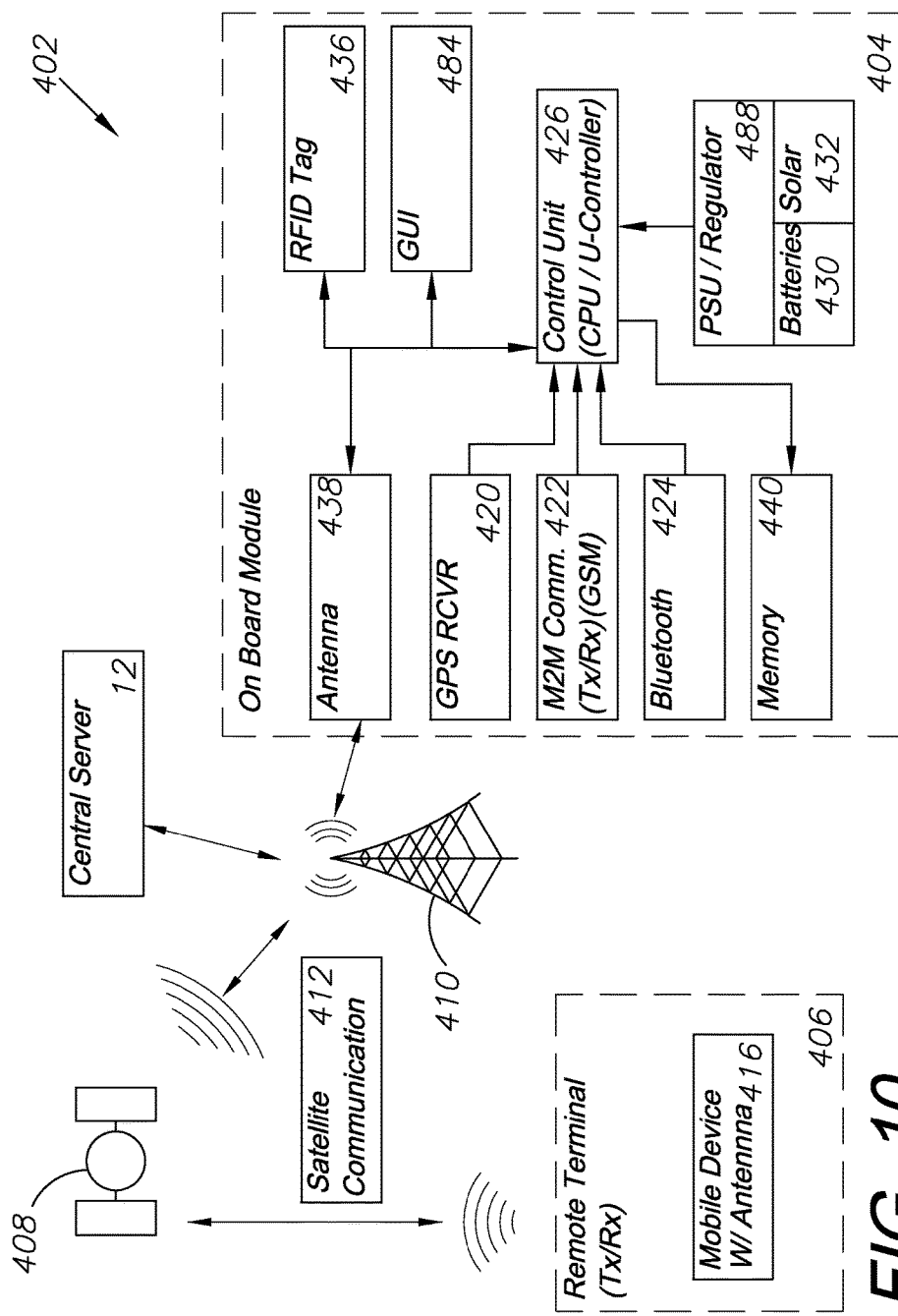
FIG. 10 is a diagrammatic representation of the alternative embodiment trip system thereof.

Another embodiment of the present invention acts as a secondary trip ID system. A digital tag, license plate, or other vehicle identification element as described in several embodiments above, could be used in conjunction with an existing physical tag. Due to State laws, the present invention may or may not require State approval or interaction with State driving laws. In an instance where a State is directly involved, temporary license plate values may be supplied directly by a State agency. Alternatively, values generated by a third party could be supplied directly to the State agency for tracking and verification. FIGS. 9 and 10 show elements of this embodiment of the present invention.

The components of the digital tag 404 or plate must necessarily be enclosed in a tamper-proof shell 464 with mounting features 486, such as the suction cups or mounting holes discussed in previous embodiments. An example could include a frame which simply attaches to or is placed next to or around an existing physical license plate 414, or placed anywhere on or in the vehicle, and which would upload data to a centralized server, such as the central server 12 discussed above. The tamper-proof shell would automatically alert the user via his smart device, alert the central server, and alert any other interested parties upon removing the digital tag from the plate or vehicle. In a preferred embodiment, the digital tag is tethered to a user's mobile computing device 416 (e.g. smart phone device) either temporarily (e.g. during a rental period) or permanently, and if the tag is removed from the vehicle without authorization from the tethered device, the alert would be sent out and the tag would be shut down. The mobile device 416 is the primary portion of a remote terminal 406 which transmits and receives satellite communication data 412, such as positioning data, from satellites 408, as well as all relevant trip or vehicle data sent through the central server 12. The satellites also communicate with various ground stations 410 which send and receive data to and from the central server 12, the on board device 404, and other communication devices and services. The existing physical license plate 414 will remain on the vehicle, and will persist when the device powers down or the digital number assigned by the central server is changed.

A preferred embodiment secondary trip ID 404 would have a display 434 providing relevant information, such as a digital license plate number, expiration of the temporary secondary ID, or other information. When not in use or upon expiration of a digital tag, the display would be blank or display all X's. The display information may be sent directly to a computer within the ID over a wireless network, or the ID may be paired with the mobile computing device carried by the driver of the vehicle, such as a smart phone. The driver may receive texts from the central server relating to the secondary ID, such as options to renew or end a temporary subscription to the ID. Fines could be automatically applied if a driver allows a tag to expire.

The display 434 could encompass a single, large display or a number of smaller displays. Each display could display a portion of the relevant data, including as little as a single character relevant to the digital ID tag.

Other features of the on-board digital tag 404 include an antenna 438 for communicating with the ground stations 410 and/or the mobile computing device 416. The antenna can communicate through a variety of wireless means, and a preferred embodiment would include a Bluetooth 424 component, an M2M communicator 422 component, and a GPS receiver 420. These communication components send information directly to the controller/CPU unit 426 which sends additional information to an RFID tag 436, a graphical user interface (GUI) 484, and the antenna 438 which in turn send data back to the CPU.

Another feature of a preferred embodiment includes a bar code 470 located on the encasement of the secondary ID device. This code could be scanned by a QR reader using a mobile computing device 416 or could be scanned by other typical means. The code would relate to a rental ID used with rental vehicles, and can be saved in the user's mobile computing device for additional communications with the third party, rental company, and/or the central server. The code could pull up a website and log data associated with the tag, such as vehicle information or trip information, and automatically store that information into the memory of the mobile device 416.

The CPU 426 and in turn the entire on board module 404 is powered by a power supply unit and regulator 488. This could be directly connected to the power supply of the vehicle, or optimally is powered by batteries 430 which are rechargeable using a solar power unit 432.

Data from large-scale use of such digital tags could be useful to governmental agencies for the purposes of tracking and planning for traffic incidents. With knowledge of planned trips and fleet information, a State could plan for police activity for diverting traffic in advance of a situation arising.

A slight variation would include an identifying character or characters representative of the state in which the secondary ID is registered (e.g. TX for a Texas license plate registration). These characters could turn off if the ID is put into use for rental purposes or if the rental time has expired, depending on the preferences of State agencies. In this way, an individual or company could purchase a digital tag representing a secondary ID in any State, but could have it registered to their preferred State for tax purposes or based upon other considerations.

The secondary ID could be assigned to a single vehicle or to a single individual and transferred amongst multiple vehicles. In the second instances, the user could update information stored at the central server using a mobile computing device to include the details about the particular vehicle being tethered to the digital tag component. Alternatively, this could be done by a rental agency when moving a tag from one vehicle to another.

This embodiment would be extremely useful for vehicle rental services, car shares, bike shares, cab drivers, and delivery drivers (any fleet). This embodiment could also be useful if combined with the temporary trip insurance feature described above.

The display elements associated with this embodiment must be modifiable on the fly. Upon the expiration of a trip, the display must be immediately ready to change to a different ID number of to be blanked out or otherwise indicate that the status of the display is inactive and not in use.

The embodiment disclosed herein would be ideal for use on trailers, semi-trailers, and moving trucks. The device could be attached to the rear doors of such vehicles in a variety of ways.

It is to be understood that while certain aspects of the disclosed subject matter have been shown and described, the disclosed subject matter is not limited thereto and encompasses various other embodiments and aspects.

The invention claimed is:

1. A system for di splaying temporary vehicle identification information, comprising:
   a smartphone associated with a driver of the vehicle, comprising:
      a smartphone transceiver;
      a wireless network interface; and
   a digital license plate, comprising:
      a processing unit;

a digital display screen configured to selectively display the temporary vehicle identification information;

a digital license plate transceiver;

wherein the digital license plate is configured to display the temporary vehicle licensing information when the digital license plate transceiver is communicatively coupled with the smartphone transceiver.

2. The system of claim 1, wherein the smartphone is further configured to request and receive the temporary vehicle identification information from a license generator.

3. The system of claim 2, wherein the smartphone is further configured to transmit the temporary vehicle identification information, via the smartphone transceiver and the digital license plate transceiver, to the digital license plate.

4. The system of claim 2, wherein the license generator is a governmental agency.

5. The system of claim 1, wherein the smartphone communicates with the digital license plate via a car sharing application.

6. The system of claim 1, wherein the digital license plate is configured to be affixed to a door of the vehicle, and wherein the vehicle is selected from a set consisting of a trailer, a semi trailer, and a moving truck.

7. The system of claim 1, wherein the digital license plate is configured to blank the digital display screen of the digital license plate if transceiver is no longer communicatively coupled with the smartphone transceiver.

8. The method of claim 1, wherein the temporary vehicle identification comprises a secondary identifier identifying temporary licensure information required by a governmental authority to drive the vehicle.

9. A method for displaying temporary vehicle identification information, comprising the steps of:

transmitting, by a smartphone associated with a driver of a vehicle and to a digital license plate associated with the vehicle, the temporary vehicle identification information;

receiving, by a digital license plate and from a smartphone, the temporary vehicle identification information;

displaying, by the digital license plate on a digital display screen, the temporary vehicle identification information;

detecting, by the digital license plate, a lack of communication with the smartphone associated with the driver; and in response to the detecting, blanking the digital display screen of the digital license plate.

10. The method of claim 9, further comprising the steps of:

requesting, by the smartphone, the temporary vehicle identification information from a license generator; and receiving, by the smartphone and from the license generator, the temporary vehicle identification information.

11. The method of claim 10, wherein the license generator is a server associated with a car share application.

12. The method of claim 9, wherein the temporary vehicle identification information comprises temporary licensure indicia identifying the vehicle for tax purposes.

13. A system for displaying temporary vehicle identification information, comprising:

a digital license plate, comprising:

a processing unit;

a digital display screen configured to selectively display the temporary vehicle identification information;

a digital license plate transceiver;

one or more non-transitory computer-readable media storing computer-executable instructions, which when executed by a processor of a mobile computer, cause the mobile computer to perform a method comprising the steps of:

transmitting, via a mobile computer transceiver and to the digital license plate transceiver, the temporary vehicle identification information; and maintain communication with the digital license plate, such that the mobile computer is tethered to the digital license plate;

wherein the digital license plate is configured to:

in response to receiving the temporary vehicle identification information, display the temporary vehicle identification information;

in response to determining that the mobile computer is no longer tethered to the digital license plate, blanking the digital display screen.

14. The system of claim 13, wherein the computer-executable instructions are part of a car share application on the mobile computer.

15. The system of claim 13, wherein the computer-executable instructions are part of a rental car application on the mobile computer.

16. The system of claim 13, wherein the mobile computer is integrated into the digital license plate.

17. The system of claim 13, wherein the method further comprises the steps of:

requesting, the temporary vehicle identification information from a license generator; and receiving, from the license generator, the temporary vehicle identification information.

18. The system of claim 17, wherein the license generator is a governmental agency.

19. The system of claim 13, wherein the temporary vehicle identification information comprises a digital license plate number.

20. The system of claim 13, wherein the temporary vehicle identification information comprises a secondary identifier identifying temporary licensure information required by a governmental authority to drive the vehicle.

* * * * *